United States Patent
I et al.

(10) Patent No.: US 9,783,675 B2
(45) Date of Patent: Oct. 10, 2017

(54) RESIN COMPOSITION AND MOLDED ARTICLE THEREOF

(71) Applicant: ASAHI KASEI KABUSHIKI KAISHA, Tokyo (JP)

(72) Inventors: Shunichiro I, Tokyo (JP); Mihoko Yamamoto, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/025,583

(22) PCT Filed: Sep. 26, 2014

(86) PCT No.: PCT/JP2014/075677
§ 371 (c)(1),
(2) Date: Mar. 29, 2016

(87) PCT Pub. No.: WO2015/050060
PCT Pub. Date: Apr. 9, 2015

(65) Prior Publication Data
US 2016/0237277 A1  Aug. 18, 2016

(30) Foreign Application Priority Data

Oct. 1, 2013  (JP) ................................. 2013-206526
Oct. 1, 2013  (JP) ................................. 2013-206541

(51) Int. Cl.
*C08L 71/12* (2006.01)
*C08L 53/02* (2006.01)
*C08L 23/12* (2006.01)

(52) U.S. Cl.
CPC ............. *C08L 71/123* (2013.01); *C08L 23/12* (2013.01); *C08L 71/12* (2013.01); *C08L 53/025* (2013.01)

(58) Field of Classification Search
None
See application file for complete search history.

(56) References Cited

U.S. PATENT DOCUMENTS

| | | | |
|---|---|---|---|
| 5,149,740 A | 9/1992 | Maruyama et al. | |
| 6,045,883 A | 4/2000 | Akiyama et al. | |
| 6,455,636 B2 * | 9/2002 | Sanada ................. | C08L 71/123 525/132 |
| 6,458,891 B1 | 10/2002 | Yonezawa et al. | |
| 6,509,412 B1 * | 1/2003 | Hall ........................ | C08L 53/02 524/504 |
| 6,696,520 B1 * | 2/2004 | Pellegatti ............... | C08L 53/00 525/206 |
| 2002/0156182 A1 * | 10/2002 | Adedeji ................. | C08L 23/10 525/64 |
| 2004/0014891 A1 * | 1/2004 | Krabbenborg ........... | C08F 8/34 525/191 |
| 2010/0105837 A1 | 4/2010 | Sasaki et al. | |
| 2010/0113696 A1 * | 5/2010 | Khabashesku .......... | C08K 7/24 525/55 |
| 2011/0166243 A1 * | 7/2011 | Kikuchi .................... | C08J 5/18 521/134 |
| 2014/0206810 A1 * | 7/2014 | I .............................. | C08L 23/12 524/451 |

FOREIGN PATENT DOCUMENTS

| | | |
|---|---|---|
| CN | 101646729 A | 2/2010 |
| JP | H02-248446 A | 10/1990 |
| JP | H06-057130 A | 3/1994 |
| JP | H07-224192 A | 8/1995 |
| JP | H07-224193 A | 8/1995 |
| JP | H09-012799 A | 1/1997 |
| JP | H09-012800 A | 1/1997 |
| JP | 2001-270968 A | 10/2001 |
| JP | 2003-253066 A | 9/2003 |
| JP | 2008-231277 A | 10/2008 |
| JP | 2008-291100 A | 12/2008 |
| JP | 2010-229348 A | 10/2010 |
| JP | 2010-254994 A | 11/2010 |
| JP | 2011-190358 A | 9/2011 |
| JP | 2011-252097 A | 12/2011 |
| JP | 2012-171982 A | 9/2012 |
| WO | 97-01600 A | 1/1997 |
| WO | 2000-015680 A1 | 3/2000 |
| WO | WO 2013/005806 * | 1/2013 |

OTHER PUBLICATIONS

International Search Report issued with respect to application No. PCT/JP2014/075677, mail date is Jan. 6, 2015.
International Preliminary Report on Patentability issued with respect to application No. PCT/JP2014/075677, mail date is Apr. 5, 2016.
European Search Report issued with respect to application No. 14851347.6, mail date is Aug. 31, 2016.

* cited by examiner

*Primary Examiner* — Jeffrey Mullis
(74) *Attorney, Agent, or Firm* — Greenblum & Bernstein, P.L.C.

(57) ABSTRACT

The resin composition of the present invention comprises (a) a polypropylene-based resin, (b) a polyphenylene ether-based resin, and (c) a first hydrogenated block copolymer-based resin and further comprises (d) an ethylene-α-olefin copolymer rubber and/or (e) a second hydrogenated block copolymer-based resin.

17 Claims, 1 Drawing Sheet

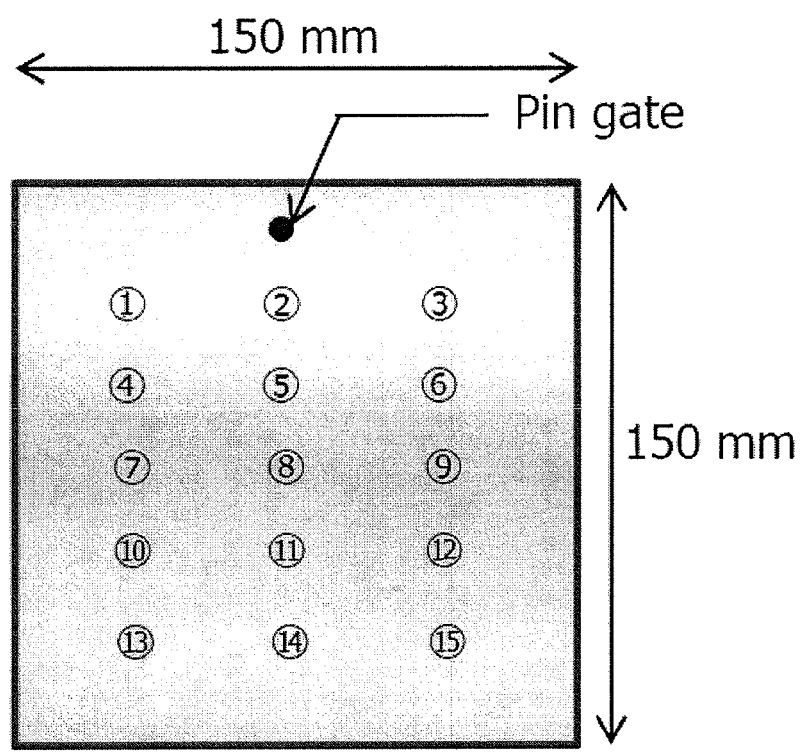

RESIN COMPOSITION AND MOLDED ARTICLE THEREOF

TECHNICAL FIELD

The present invention relates to a resin composition and a molded article thereof.

BACKGROUND ART

Polypropylene resins have excellent properties such as molding processability, water resistance, oil resistance, acid resistance, and alkali resistance. The polypropylene resins, however, are disadvantageously inferior in heat resistance, rigidity, and impact resistance and therefore known to be prepared into compositions supplemented with a polyphenylene ether resin. In the compositions, the polypropylene resin forms a matrix phase, and the polyphenylene ether resin forms a dispersed phase. As a result, the resulting resin composition is known to have improved heat resistance and rigidity.

Patent Documents 1 and 2 have each proposed a composition of a polyphenylene ether resin and a polypropylene resin. Also, Patent Documents 1, 3, and 4 have each proposed a composition of a polyphenylene ether resin, a polypropylene resin, and a hydrogenated block copolymer. As disclosed therein, the hydrogenated block copolymer acts as an admixture for the polyphenylene ether resin and the polypropylene resin and is a component that further confers impact resistance.

Referring to the hydrogenated block copolymer used in the inventions described in Patent Documents 1, 3, and 4, these documents make the following statements.

Patent Document 1 describes a hydrogenated block copolymer prepared by hydrogenating a block copolymer consisting of a polymer block A composed mainly of a vinyl aromatic compound and a polymer block B composed mainly of a conjugated diene compound in which the ratio of the amount of vinyl bonds to the amount of all bonds in the conjugated diene compound is 30 to 95%.

Patent Document 3 describes a hydrogenated block copolymer prepared by hydrogenating, at a rate of 65 to less than 80%, a block copolymer consisting of a polymer block A composed mainly of a vinyl aromatic compound and a polymer block B composed mainly of a conjugated diene compound in which the ratio of the amount of vinyl bonds to the amount of all bonds in the conjugated diene compound is 65 to 75%.

Patent Document 4 describes a hydrogenated block copolymer prepared by hydrogenating a block copolymer consisting of a polymer block A composed mainly of styrene and a polymer block B composed mainly of butadiene in which the ratio of the amount of vinyl bonds to the amount of all bonds in the butadiene is 70 to 90%, wherein the amount of bound styrene is 15 to 50% by mass, the hydrogenated block copolymer has a number-average molecular weight of 100000 or smaller, and the polymer block A has a number-average molecular weight of 8000 or larger.

LIST OF PRIOR ART DOCUMENTS

Patent Document

Patent Document 1: International Publication No. WO 97/01600
Patent Document 2: Japanese Patent Laid-Open No. 2001-270968
Patent Document 3: Japanese Patent Laid-Open No. 09-12800
Patent Document 4: Japanese Patent Laid-Open No. 2010-229348

SUMMARY OF INVENTION

Problems to be Solved by Invention

The aforementioned composition comprising a polyphenylene ether resin and polypropylene resin, as disclosed in Patent Documents 1 to 4, is drastically improved in terms of solvent resistance and is excellent in heat resistance, as compared with classical polyphenylene ether resin compositions. Nonetheless, this composition is still susceptible to improvement in terms of tensile elongation, warpage of a molded piece, and impact resistance at low temperatures.

Thus, an object of the present invention is to provide a resin composition comprising a polypropylene-based resin and a polyphenylene ether-based resin and having much better tensile elongation and impact resistance at low temperatures and small warpage of a molded piece, and a molded article thereof.

Means for Solving Problems

The present inventors have conducted diligent studies and consequently found that a resin composition comprising a polypropylene-based resin and a polyphenylene ether-based resin is allowed to contain a particular first hydrogenated block copolymer-based resin and an ethylene-α-olefin copolymer rubber and/or a particular second hydrogenated block copolymer-based resin, whereby the resulting resin composition has much better tensile elongation and low-temperature impact resistance and small warpage of a molded piece.

Specifically, the present invention is as follows.

[1] A resin composition comprising (a) a polypropylene-based resin, (b) a polyphenylene ether-based resin, and (c) a first hydrogenated block copolymer-based resin, and further comprising (d) an ethylene-α-olefin copolymer rubber and/or (e) a second hydrogenated block copolymer-based resin, wherein each of the components (c) and (e) is a hydrogenated block copolymer prepared by hydrogenating a block copolymer comprising at least one polymer block A composed mainly of a vinyl aromatic compound and at least one polymer block B composed mainly of a conjugated diene compound, and/or a modified product of the hydrogenated block copolymer, a total ratio of a 1,2-vinyl bond and a 3,4-vinyl bond to all bonds in the conjugated diene compound units in the component (c) is 45 to 90%, the component (c) comprises 30 to 50% by mass of the vinyl aromatic compound units, a total ratio of a 1,2-vinyl bond and a 3,4-vinyl bond to all bonds in the conjugated diene compound units in the component (e) is 25% or more and less than 60%, a rate of hydrogenation of ethylenic double bonds (double bonds in the conjugated diene compound units) in the block copolymer in the component (c) is 80 to 100%, and a rate of hydrogenation of ethylenic double bonds (double bonds in the conjugated diene compound units) in the block copolymer in the component (e) is 10% or higher and lower than 80%.

[2] The resin composition according to above-described [1], wherein the resin composition comprises at least the component (d).

[3] The resin composition according to above-described [1] or [2], wherein the component (d) has a melt flow rate (MFR; measured under a load of 2.16 kg at 190° C. according to ASTM D-1238) of 0.1 to 4.5 g/10 min.

[4] The resin composition according to any one of above-described [1] to [3], wherein the component (d) has a shore A hardness (according to ASTM D-2240) of 75 or smaller.

[5] The resin composition according to above-described [2], wherein
a total content of the components (c) and (d) is 1 to 50 parts by mass with respect to a total content (100 parts by mass) of the components (a) and (b),
a mass ratio between the components (a) and (b) ((a):(b)) is 25:75 to 99:1, and
a mass ratio between the components (c) and (d) ((c):(d)) is 1:99 to 99:1.

[6] The resin composition according to any one of above-described [1] to [5], wherein the resin composition further comprises at least the component (e),
a total content of the components (c) and (e) is 1 to 50 parts by mass with respect to a total content (100 parts by mass) of the components (a) and (b),
a mass ratio between the components (a) and (b) ((a):(b)) is 25:75 to 99:1, and
a mass ratio between the components (c) and (e) ((c):(e)) is 1:99 to 99:1.

[7] The resin composition according to any one of above-described [1] to [6], wherein the total ratio of a 1,2-vinyl bond and a 3,4-vinyl bond to all bonds in the conjugated diene compound units in the component (c) is 70 to 90%.

[8] The resin composition according to any one of above-described [1] to [7], wherein the component (e) comprises 20 to 70% by mass of the vinyl aromatic compound units.

[9] The resin composition according to any one of above-described [1] to [8], wherein the polymer block A constituting the component (e) has a number-average molecular weight (MndA) of 5,000 to 25,000.

[10] The resin composition according to any one of above-described [1] to [9], further comprising (f) a third hydrogenated block copolymer-based resin, wherein
a content of the component (f) is 1 to 15 parts by mass with respect to a total content (100 parts by mass) of the components (a) and (b),
the component (f) is a hydrogenated block copolymer prepared by hydrogenating a block copolymer comprising at least one polymer block A composed mainly of a vinyl aromatic compound and at least one polymer block B composed mainly of a conjugated diene compound, and/or a modified product of the hydrogenated block copolymer,
the component (f) comprises 10% by mass or larger and smaller than 30% by mass of the vinyl aromatic compound units,
a total ratio of a 1,2-vinyl bond and a 3,4-vinyl bond to all bonds in the conjugated diene compound units in the component (f) is 25% or more and less than 70%,
a rate of hydrogenation of ethylenic double bonds (double bonds in the conjugated diene compound units) in the block copolymer in the component (f) is 80 to 100%, and
the polymer block A constituting the component (f) has a number-average molecular weight (MneA) of 4,000 to 8,000.

[11] The resin composition according to any one of above-described [1] to [10], wherein the resin composition comprises the component (d) and the component (e).

[12] The resin composition according to any one of above-described [1] to [11], wherein the component (d) is a copolymer rubber of ethylene and 1-octene.

[13] The resin composition according to any one of above-described [1] to [12], wherein
the component (a) is homopolypropylene and/or block polypropylene, and
the component (a) has a melt flow rate (MFR; measured under a load of 2.16 kg at 230° C. according to JIS K7210) of 0.1 to 100 g/10 min.

[14] The resin composition according to any one of above-described [1] to [13], wherein the resin composition has a matrix phase comprising the component (a) and a dispersed phase comprising the component (b).

[15] A resin composition comprising (a) a polypropylene-based resin, (b) a polyphenylene ether-based resin, and (c) a hydrogenated block copolymer-based resin, wherein
the component (c) is a hydrogenated block copolymer prepared by hydrogenating a block copolymer comprising at least one polymer block A composed mainly of a vinyl aromatic compound and at least one polymer block B composed mainly of a conjugated diene compound, and/or a modified product of the hydrogenated block copolymer, and
a ratio of a loss tangent at −50° C. (−50° C. tan δ) to a loss tangent at 0° C. (0° C. tan δ) (−50° C. tan δ/0° C. tan δ) obtained by the following measurement method is 0.39 or more;
<Measurement of Loss Tangent (Tan δ)>
the loss tangent (tan δ) of an ISO test piece obtained from the resin composition is measured at −50° C. and 0° C. using a viscoelasticity measuring machine at a tensile mode under temperature sweep conditions involving an oscillation frequency of 10 Hz, a strain of 0.2% under static stress, a strain of 0.1% under dynamic stress, a contact load of 0.5 N, a rate of temperature rise of 3° C./min, and a temperature range of −100° C. to 160° C.

[16] A molded article comprising a resin composition according to any one of above-described [1] to [15].

Advantages of Invention

The present invention can provide a resin composition having much better tensile elongation and low-temperature impact resistance and small warpage of a molded piece, and a molded article prepared using this resin composition.

BRIEF DESCRIPTION OF DRAWINGS

FIG. 1 is a schematic diagram illustrating positions for measuring warpage of a molded piece in Examples of the present application.

MODE FOR CARRYING OUT INVENTION

Hereinafter, a mode for carrying out the present invention (hereinafter, referred to as the "present embodiment") will be described in detail. The present embodiment described below is given merely for illustrative purposes and is not intended to limit the present invention. The present invention can be carried out with appropriate changes or modifications without departing from the spirit thereof.

<<Resin Composition>>

The resin composition of the present embodiment contains
(a) a polypropylene-based resin, (b) a polyphenylene ether-based resin, and (c) a first hydrogenated block copolymer-based resin and further contains (d) an ethylene-α-olefin copolymer rubber and/or (e) a second hydrogenated block copolymer-based resin, wherein each of the components (c) and (e) is a hydrogenated block copolymer prepared by hydrogenating a block copolymer comprising at least one polymer block A composed mainly of a vinyl aromatic compound and at least one polymer block B composed mainly of a conjugated diene compound, and/or a modified product of the hydrogenated block copolymer, the total ratio of a 1,2-vinyl bond and a 3,4-vinyl bond to all bonds in the conjugated diene compound units in the component (c) is 45 to 90%, the component (c) contains 30 to 50% by mass of the vinyl aromatic compound units, the total ratio of a 1,2-vinyl bond and a 3,4-vinyl bond to all bonds in the conjugated diene compound units in the component (e) is 25% or more and less than 60%, the rate of hydrogenation of ethylenic double bonds (double bonds in the conjugated diene compound units) in the block copolymer in the component (c) is 80 to 100%, and the rate of hydrogenation of ethylenic double bonds (double bonds in the conjugated diene compound units) in the block copolymer in the component (e) is 10% or higher and lower than 80%.

Preferably, the component (d) has a melt flow rate (MFR; measured under a load of 2.16 kg at 190° C. according to ASTM D-1238) of 0.1 to 4.5 g/10 min.

Preferably, the component (d) has a shore A hardness (according to ASTM D-2240) of 75 or smaller.

In the present embodiment, the properties of the component (d) are properties of the component (d) alone.

[Component (a)]

Examples of the polypropylene-based resin (a) (hereinafter, also referred to as a "component (a)") used in the present embodiment include, but are not particularly limited to, (a1) a polypropylene resin and (a2) a modified polypropylene resin mentioned later.

<(a1) Polypropylene Resin>

The polypropylene resin (a1) is not particularly limited as long as the polypropylene resin is a polymer in which 50% by mol or more of monomers constituting the polymer are propylene. Examples thereof include: crystalline propylene homopolymers; and crystalline propylene-α-olefin block copolymers, such as a crystalline propylene-ethylene block copolymer, which have a crystalline propylene homopolymer moiety obtained by the first step of polymerization, and a propylene-α-olefin random copolymer moiety obtained by copolymerizing propylene and ethylene and/or at least one different α-olefin (e.g., butene-1 and hexene-1) in the second or later step of polymerization. The proportion of propylene in the monomers constituting the polypropylene resin (a1) is preferably 70% by mol or more, more preferably 90% by mol or more. One of these polypropylene resins (a1) may be used alone, or two or more thereof may be used in combination. Examples of the case of using two or more thereof in combination include, but are not particularly limited to, a mixture of a crystalline propylene homopolymer and a crystalline propylene-ethylene block copolymer (except for those having a shore A hardness of 75 or smaller). The polypropylene resin (a1) is preferably homopolypropylene and/or block polypropylene.

Examples of the method for producing the polypropylene resin (a1) include, but are not particularly limited to, a method which involves polymerizing monomers containing propylene at a polymerization temperature ranging from 0 to 100° C. and a polymerization pressure ranging from 3 to 100 atm in the presence of a titanium trichloride catalyst, or a titanium halide catalyst or the like supported by a carrier such as magnesium chloride and an alkyl aluminum compound. In this operation, a chain transfer agent such as hydrogen may be added in order to adjust the molecular weight of the resulting polymer.

The polymerization method is not particularly limited and may be any of batch and continuous methods. Other examples of the polymerization method that can be used include: solution polymerization in the presence of a solvent such as butane, pentane, hexane, heptane, or octane; slurry polymerization; bulk polymerization in monomers in the absence of a solvent; and gas-phase polymerization in monomers in a gas state.

An electron-donating compound serving as an internal donor component or an external donor component can be further used as a third catalytic component in the polymerization catalyst in order to enhance the isotacticity and polymerization activity of the resulting polypropylene resin (a1). The type of this electron-donating compound is not particularly limited, and any electron-donating compound known in the art can be used. Examples thereof include: ester compounds such as ε-caprolactone, methyl methacrylate, ethyl benzoate, and methyl toluate; phosphorous acid esters such as triphenyl phosphite and tributyl phosphite; phosphoric acid derivatives such as hexamethylphosphoramide; and alkoxy ester compounds, aromatic monocarboxylic acid esters, aromatic alkylalkoxysilanes, aliphatic hydrocarbon alkoxysilanes, various ether compounds, various alcohols, and/or various phenols.

The melt flow rate (MFR) (value measured under a load of 2.16 kg at 230° C. according to JIS K7210) of the polypropylene resin (a1) is in the range of preferably 0.1 to 100 g/10 min, more preferably 0.1 to 80 g/10 min. When the MFR of the polypropylene resin (a1) falls within this range, the resulting resin composition tends to have the improved balance between flowability and rigidity.

Examples of the method for controlling the MFR of the polypropylene resin (a1) within the aforementioned range include, but are not particularly limited to, a method of controlling the ratio of hydrogen supply to monomers.

<(a2) Modified Polypropylene Resin>

The modified polypropylene resin (a2) refers to, for example, a resin obtained by reacting the polypropylene resin (a1) with an α,β-unsaturated carboxylic acid or a derivative thereof in a melted state or a solution state at 30 to 350° C. in the presence or absence of a radical generating agent. Examples of the modified polypropylene resin (a2) include, but are not particularly limited to, modified polypropylene resins prepared by grafting or adding an α,β-unsaturated carboxylic acid or a derivative thereof at a rate of 0.01 to 10% by mass to the polypropylene resin (a1). Examples of the α,β-unsaturated carboxylic acid or the derivative thereof include, but are not particularly limited to, maleic anhydride and N-phenylmaleimide.

In the case of using the polypropylene resin (a1) and the modified polypropylene resin (a2) in combination, the mixing ratio between the polypropylene resin (a1) and the modified polypropylene resin (a2) in the polypropylene-based resin (a) is not particularly limited and can be arbitrarily determined.

The polypropylene-based resin (a) used in the present embodiment can be obtained by the aforementioned method or any of other methods known in the art. The polypropylene-based resins (a) having any crystallinity or melting point may each be used alone or may be used in combination of two or more types thereof.

[Component (b)]

Examples of the polyphenylene ether-based resin (b) (hereinafter, also simply referred to as a "component (b)" or "PPE") used in the present embodiment include, but are not particularly limited to, (b1) a polyphenylene ether resin and (b2) a modified polyphenylene ether resin mentioned later.

<(b1) Polyphenylene Ether Resin>

The polyphenylene ether resin (b1) is a homopolymer and/or a copolymer containing a repeat unit structure represented by the formula (1) given below. The reduced viscosity (measured at 30° C. in a 0.5 g/dL chloroform solution) of the polyphenylene ether resin (b1) is in the range of preferably 0.15 to 2.50, more preferably 0.30 to 2.00, further preferably 0.35 to 2.00.

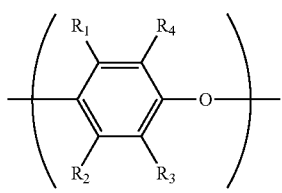

(1)

In the formula (1), $R_1$, $R_2$, $R_3$, and $R_4$ each independently represent a monovalent group selected from the group consisting of a hydrogen atom, a halogen atom, a primary or secondary alkyl group having 1 to 7 carbon atoms, a phenyl group, a haloalkyl group, an aminoalkyl group, a hydrocarbon oxy group, and a halo-hydrocarbon oxy group in which at least 2 carbon atoms intervene the halogen atom and the oxygen atom.

The polyphenylene ether resin (b1) used in the present embodiment is not particularly limited, and a polyphenylene ether resin known in the art can be used. Specific examples of the polyphenylene ether resin (b1) include, but are not particularly limited to: homopolymers such as poly(2,6-dimethyl-1,4-phenylene ether), poly(2-methyl-6-ethyl-1,4-phenylene ether), poly(2-methyl-6-phenyl-1,4-phenyl ene ether), and poly(2,6-dichloro-1,4-phenylene ether); and copolymers of 2,6-dimethylphenol and other phenols (e.g., 2,3,6-trimethylphenol and 2-methyl-6-butylphenol).

Among them, poly(2,6-dimethyl-1,4-phenylene ether) or a copolymer of 2,6-dimethylphenol and 2,3,6-trimethylphenol is preferred, and poly(2,6-dimethyl-1,4-phenylene ether) is more preferred.

The method for producing the polyphenylene ether resin (b1) is not particularly limited, and a conventional method known in the art can be used. The polyphenylene ether resin (b1) can be readily produced by the oxidative polymerization of, for example, 2,6-xylenol, using a complex of copper (I) salt and amine described in, for example, U.S. Pat. No. 3,306,874, as a catalyst. Also, the polyphenylene ether resin (b1) can be produced by a method or the like described in, for example, U.S. Pat. No. 3,306,875, U.S. Pat. No. 3,257,357, U.S. Pat. No. 3,257,358, Japanese Patent Publication No. 52-17880, Japanese Patent Laid-Open No. 50-51197, and Japanese Patent Laid-Open No. 63-152628.

<(b2) Modified Polyphenylene Ether Resin>

The modified polyphenylene ether resin (b2) refers to, for example, a resin obtained by reacting the polyphenylene ether resin (b1) with a styrene-based monomer and/or an α,β-unsaturated carboxylic acid or a derivative thereof (examples thereof include maleic anhydride, N-phenylmaleimide, unsaturated dicarboxylic acids such as fumaric acid and derivatives thereof, and vinyl compounds such as styrene, acrylic acid ester, and methacrylic acid ester) in a melted state, a solution state, or a slurry state at 80 to 350° C. in the presence or absence of a radical generating agent. Examples of the modified polyphenylene ether resin (b2) include, but are not particularly limited to, modified polyphenylene ether resins prepared by grafting or adding a styrene-based monomer and/or an α,β-unsaturated carboxylic acid or a derivative thereof at a rate of 0.01 to 10% by mass to the polyphenylene ether resin (b1). In this context, the styrene-based monomer refers to styrene or a compound derived from styrene by the replacement of one or more hydrogen molecules with a substituent selected from the group consisting of a halogen atom, a primary or secondary alkyl group having 1 to 7 carbon atoms, a phenyl group, a haloalkyl group, an aminoalkyl group, a hydrocarbon oxy group, and a halo-hydrocarbon oxy group in which at least 2 carbon atoms intervene the halogen atom and the oxygen atom.

In the case of using the polyphenylene ether resin (b1) and the modified polyphenylene ether resin (b2) in combination, the mixing ratio between the polyphenylene ether resin (b1) and the modified polyphenylene ether resin (b2) in the polyphenylene ether-based resin (b) is not limited and can be arbitrarily determined.

[Component (c)]

The first hydrogenated block copolymer-based resin (c) (hereinafter, also referred to as a "component (c)") used in the present embodiment is (c1) a first hydrogenated block copolymer and/or (c2) a first modified hydrogenated block copolymer mentioned later.

<Component (c1)>

The first hydrogenated block copolymer (c1) is a hydrogenated block copolymer prepared by hydrogenating a block copolymer containing at least one polymer block A composed mainly of a vinyl aromatic compound and at least one polymer block B composed mainly of a conjugated diene compound, wherein the total ratio of a 1,2-vinyl bond and a 3,4-vinyl bond to all bonds in the conjugated diene compound units (hydrogenated block copolymer-constituting units derived from the conjugated diene compound) is 45 to 90%; the hydrogenated block copolymer contains 30 to 50% by mass of the vinyl aromatic compound units (hydrogenated block copolymer-constituting units derived from the vinyl aromatic compound); and the rate of hydrogenation of ethylenic double bonds (double bonds in the conjugated diene compound units) in the block copolymer is 80 to 100%.

(Polymer Block A)

The polymer block A composed mainly of a vinyl aromatic compound is a homopolymer block of the vinyl aromatic compound or a copolymer block of the vinyl aromatic compound and a conjugated diene compound. The phrase "composed mainly of a vinyl aromatic compound" for the polymer block A means that the polymer block A contains more than 50% by mass of the vinyl aromatic compound units. The polymer block A preferably contains 70% by mass or larger of the vinyl aromatic compound units.

Examples of the vinyl aromatic compound include, but are not particularly limited to, styrene, α-methylstyrene, vinyltoluene, p-tert-butylstyrene, and diphenylethylene. One of these vinyl aromatic compounds may be used alone, or two or more thereof may be used. Among them, styrene is preferred. Examples of the conjugated diene compound include compounds mentioned later. One of these compounds may be used alone, or two or more thereof may be used.

(Polymer Block B)

The polymer block B composed mainly of a conjugated diene compound is a homopolymer block of the conjugated diene compound or a random copolymer block of the conjugated diene compound and a vinyl aromatic compound. The phrase "composed mainly of a conjugated diene compound" for the polymer block B means that the polymer block B contains more than 50% by mass of the conjugated diene compound units. The polymer block B preferably contains 70% by mass or larger of the conjugated diene compound units.

Examples of the conjugated diene compound include, but are not particularly limited to, butadiene, isoprene, 1,3-pentadiene, and 2,3-dimethyl-1,3-butadiene. One of these conjugated diene compounds may be used alone, or two or more thereof may be used. Among them, butadiene, isoprene or a combination thereof is preferred. Examples of the vinyl aromatic compound include the compounds mentioned above. One of these compounds may be used alone, or two or more thereof may be used.

When the polymer block B is a polymer block composed mainly of butadiene, the total ratio of a 1,2-vinyl bond and a 3,4-vinyl bond in the butadiene in the polymer block B is preferably 65 to 90%.

In the polymer block B, each conjugated diene compound unit is bonded through a 1,2-vinyl bond, a 3,4-vinyl bond, or a 1,4-conjugate bond to its adjacent monomer unit. When the total amount of these 3 bonds is defined as the "amount of all bonds", the polymer block B may be a polymer block of single conjugated diene compound units in which the ratio of the total sum of the amount of the 1,2-vinyl bond and the amount of the 3,4-vinyl bond (hereinafter, also referred to as the "total amount of vinyl bonds") to the amount of all bonds is 45 to 90%, or may be a polymer block composed mainly of conjugated diene compounds having both of at least one polymer block B1 composed mainly of a conjugated diene compound in which the ratio of the total amount of vinyl bonds is 45 to 90% and at least one polymer block B2 composed mainly of a conjugated diene compound in which the ratio of the total amount of vinyl bonds is 30% or more and less than 45%.

The block copolymer exhibiting such a block structure is represented by, for example, A-B2-B1-A wherein "A" represents the polymer block A, "B1" represents the polymer block B1, and "B2" represents the polymer block B2. This block copolymer can be obtained by a polymerization method known in the art for controlling the total amount of vinyl bonds on the basis of the adjusted feed sequence of each monomer unit.

In the present embodiment, the ratio of the total amount of vinyl bonds to the amount of all bonds in the conjugated diene compound can be determined using an infrared spectrophotometer.

(Structure of Block Copolymer)

The block copolymer is preferably a vinyl aromatic-conjugated diene compound block copolymer having a structure in which block units are bonded, for example, A-B-A type, A-B-A-B type, B-A-B-A type, (A-B-)n-X type (wherein n represents an integer of 1 or larger, and X represents a reaction residue of a polyfunctional coupling agent such as silicon tetrachloride or tin tetrachloride, or a residue of an initiator such as a polyfunctional organic lithium compound), or A-B-A-B-A type wherein "A" represents the polymer block A, and "B" represents the polymer block B. Among them, a block copolymer having an A-B-A-B type or B-A-B-A type structure is more preferred because this block copolymer is superior in flowability as the component (c) to a block copolymer having an A-B-A type structure.

The molecular structure of the block copolymer containing the polymer block A and the polymer block B is not particularly limited and may be, for example, linear, branched, radial, or any combination thereof. The polymer block A and the polymer block B may each be a polymer block constituted by random distribution, tapered distribution (in which the monomer components are increased or decreased along with the molecular chain), or partially block distribution of the vinyl aromatic compound and the conjugated diene compound, or any combination thereof in the molecular chain. When two or more polymer blocks A or polymer blocks B are present in the repeat units, these polymer blocks may have the same structures or may have different structures.

In the block copolymer, the ratio of the total amount of vinyl bonds to the amount of all bonds in the conjugated diene compound is preferably 45 to 90%, more preferably 50 to 90%, further preferably 65 to 90%, particularly preferably 70 to 90%. When the ratio of the total amount of vinyl bonds exceeds 90%, industrial production may become difficult.

(Amount of Vinyl Bond)

The total ratio of a 1,2-vinyl bond and a 3,4-vinyl bond to all bonds in the conjugated diene compound units in the component (c1) is 45 to 90%, preferably 50 to 90%, more preferably 65 to 90%, further preferably 70 to 90%.

When the total ratio of a 1,2-vinyl bond and a 3,4-vinyl bond falls within this range, the component (c1) is excellent in compatibility with the component (a). The resulting resin composition has improved mechanical properties.

Examples of the method for controlling the total ratio of a 1,2-vinyl bond and a 3,4-vinyl bond within the aforementioned range include, but are not particularly limited to, a method of adding an adjuster of the amount of the 1,2-vinyl bond in the production of the component (c1), and a method of adjusting the polymerization temperature.

In this context, the "total amount of vinyl bonds to the amount of all bonds (the total ratio of a 1,2-vinyl bond and a 3,4-vinyl bond to all bonds) in the conjugated diene compound" refers to the amount of vinyl bonds in the block copolymer before hydrogenation of the hydrogenated block copolymer-based resin. This can be measured, for example, by applying the block copolymer before hydrogenation to an infrared spectrophotometer and calculated by the Hampton technique. Alternatively, this value can be calculated from the block copolymer after hydrogenation by use of nuclear magnetic resonance (NMR).

(Rate of Hydrogenation)

In the first hydrogenated block copolymer (c1), the rate of hydrogenation of ethylenic double bonds (double bonds in the conjugated diene compound units) in the block copolymer is 80 to 100%, more preferably 85% or higher, particularly preferably 90% or higher. The rate of hydrogenation that falls within this range is preferred from the viewpoint of obtaining a resin composition having favorable heat resistance and weather resistance.

Examples of the method for controlling the rate of hydrogenation within the aforementioned range include, but are not particularly limited to, a method of controlling the amount of hydrogen consumption within a range that achieves the desired rate of hydrogenation in the hydrogenation reaction of ethylenic double bonds in the block copolymer.

In the present embodiment, the rate of hydrogenation can be measured by nuclear magnetic resonance (NMR). Specifically, the rate of hydrogenation can be measured by a method described in Examples mentioned later.

(Production Method)

The method for producing the first hydrogenated block copolymer (c1) is not particularly limited, and a production method known in the art can be used. Examples of the production method known in the art include, but are not particularly limited to, methods described in Japanese Patent Laid-Open No. 47-11486, Japanese Patent Laid-Open No. 49-66743, Japanese Patent Laid-Open No. 50-75651, Japanese Patent Laid-Open No. 54-126255, Japanese Patent Laid-Open No. 56-10542, Japanese Patent Laid-Open No. 56-62847, Japanese Patent Laid-Open No. 56-100840, Japanese Patent Laid-Open No. 2-300218, U.K. Patent No. 1130770, U.S. Pat. No. 3,281,383, U.S. Pat. No. 3,639,517, U.K. Patent No. 1020720, U.S. Pat. No. 3,333,024, and U.S. Pat. No. 4,501,857.

<Component (c2)>

The first modified hydrogenated block copolymer (c2) refers to, for example, a modified hydrogenated block copolymer obtained by reacting the first hydrogenated block copolymer (c1) with an α,β-unsaturated carboxylic acid or a derivative thereof (ester compound or acid anhydride compound) in a melted state, a solution state, or a slurry state at 80 to 350° C. in the presence or absence of a radical generating agent. In this case, the α,β-unsaturated carboxylic acid or the derivative thereof is preferably grafted or added at a rate of 0.01 to 10% by mass to the first hydrogenated block copolymer (c1).

In the case of using the first hydrogenated block copolymer (c1) and the first modified hydrogenated block copolymer (c2) in combination, the mixing ratio between the first hydrogenated block copolymer (c1) and the first modified hydrogenated block copolymer (c2) in the first hydrogenated block copolymer-based resin (c) is not particularly limited and can be arbitrarily determined.

<Number-Average Molecular Weight>

The number-average molecular weight (Mnc) of the component (c) is preferably 5,000 to 1,000,000, more preferably 100,000 or smaller. When the Mnc is 1,000,000 or smaller, the role of the first hydrogenated block copolymer-based resin (c) in the resin composition tends to be an absolute role as a polymer (polypropylene)-polymer (polyphenylene ether) emulsifying dispersant (admixture). Specifically, for favorably diffusing the first hydrogenated block copolymer-based resin (c) as an emulsifying dispersant (admixture) in the melt mixing system for the emulsification in a melted bulk state of polymer (polypropylene)-polymer (polyphenylene ether) having a high viscosity, the number-average molecular weight (Mnc) of the component (c) is preferably 5,000 to 1,000,000, more preferably 100,000 or smaller in consideration of the melt viscosity of the first hydrogenated block copolymer-based resin (c).

Examples of the method for controlling the number-average molecular weight (Mnc) of the component (c) within the aforementioned range include, but are not particularly limited to, a method of adjusting the amount of the catalyst in the polymerization step for the component (c).

In the present embodiment, the number-average molecular weight (Mnc) of the component (c) can be measured using Gel Permeation Chromatography System 21 manufactured by Showa Denko K.K. under conditions given below. In the measurement, the column used is one K-G, one K-800RL, and one K-800R (all manufactured by Showa Denko K.K.) connected in series in this order. The column temperature is set to 40° C. Chloroform is used as a solvent. The solvent flow rate is set to 10 mL/min. The sample concentration is set to 1 g of a hydrogenated block copolymer/L of a chloroform solution. A calibration curve is prepared using standard polystyrenes (the standard polystyrenes have molecular weights of 3650000, 2170000, 1090000, 681000, 204000, 52000, 30200, 13800, 3360, 1300, and 550). In the measurement, the UV (ultraviolet) wavelength of the detection unit is set to 254 nm both for the standard polystyrenes and for the hydrogenated block copolymer.

<Content of Vinyl Aromatic Compound Unit>

The content of the vinyl aromatic compound units (hydrogenated block copolymer-constituting units derived from the vinyl aromatic compound) in the component (c) is 30 to 50% by mass, preferably 30 to 48% by mass, more preferably 30 to 45% by mass, further preferably 35 to 45% by mass. When the content of the vinyl aromatic compound units is 30% by mass or larger, the resulting resin composition has improved mechanical strength. When the content of the vinyl aromatic compound units is 50% by mass or smaller, the resulting resin composition is excellent in the balance between heat resistance and impact resistance. In the present embodiment, the content of the vinyl aromatic compound units can be measured using an ultraviolet spectrophotometer (UV). Specifically, the content of the vinyl aromatic compound units can be measured by a method described in Examples mentioned later.

The first hydrogenated block copolymer-based resin (c) in which the content of the vinyl aromatic compound units is 30 to 50% by mass imparts favorable emulsification and dispersion to the polyphenylene ether-based resin in the emulsification and dispersion between the polypropylene-based resin and the polyphenylene ether-based resin, and imparts great superiority to the heat resistance, mechanical properties, and impact resistance of the resulting resin composition.

[Component (d)]

The ethylene-α-olefin copolymer rubber (d) (hereinafter, also referred to as a "component (d)") used in the present embodiment is a copolymer rubber of ethylene and an α-olefin. The component (d) is not particularly limited, and an ethylene-α-olefin copolymer rubber known in the art may be used. Its melt flow rate (MFR; measured under a load of 2.16 kg at 190° C. according to ASTM D-1238) is preferably 0.1 to 4.5 g/10 min, and its shore A hardness (according to ASTM D-2240) is preferably 75 or smaller.

Examples of the component (d) include, but are not particularly limited to, a copolymer rubber of ethylene and one or two or more C3 to C20 α-olefins. The component (d) is preferably a copolymer rubber of ethylene and one or two or more C3 to C10 α-olefins, more preferably a copolymer rubber of ethylene and one or two or more C4 to C8 α-olefins, further preferably a copolymer rubber of ethylene and one or two or more comonomers selected from the group consisting of propylene, 1-butene, 1-hexene, 4-methyl-1-pentene, and 1-octene, particularly preferably a copolymer rubber of ethylene and 1-octene. Use of such a copolymer as the component (d) tends to yield a resin composition having higher tensile elongation and higher impact resistance.

Examples of the method for preparing the ethylene-α-olefin copolymer rubber (d) include, but are not particularly limited to, a method using a catalyst (e.g., a catalyst based on titanium, metallocene, or vanadium) that permits easy obtainment of a high-molecular-weight α-olefin copolymer under processing conditions usually performed. Among others, a method using a metallocene catalyst and a titanium chloride catalyst is preferred from the viewpoint of the stable structural control. A method known in the art as described in, for example, Japanese Patent Laid-Open No. 6-306121 or National Publication of International Patent Application No. 1995-500622 can be used as a method for producing the ethylene-α-olefin copolymer rubber (d).

The shore A hardness (according to ASTM D-2240) of the component (d) alone is preferably 75 or smaller, more preferably 70 or smaller, further preferably 65 or smaller, from the viewpoint of the low-temperature impact resistance of the resin composition. The lower limit of the shore A hardness of the component (d) alone is not particularly limited and is, for example, 48 or larger.

Examples of the method for controlling the shore A hardness of the component (d) within the aforementioned range include, but are not particularly limited to, a method of adjusting the shore A hardness by controlling the content ratio or density of the ethylene units.

The content of the α-olefin in the component (d) is not particularly limited and is preferably 5% by mass or larger, more preferably 20% by mass or larger, from the viewpoint of the cold cure resistance and flexibility of the resin composition. Also, the content of the α-olefin in the component (d) is preferably 50% by mass or smaller, more preferably 48% by mass or smaller, from the viewpoint of the rigidity of the resin composition.

The density of the component (d) alone is not particularly limited and is preferably 0.850 g/cm$^3$ or higher, more preferably 0.855 g/cm$^3$ or higher, from the viewpoint of the rigidity of the resin composition. The density is preferably 0.910 g/cm$^3$ or lower, more preferably 0.885 g/cm$^3$ or lower, from the viewpoint of obtaining a resin composition having high impact resistance and high tensile elongation at break.

Two or more ethylene-α-olefin copolymer rubbers may be used as the component (d). In this case, two or more ethylene-α-olefin copolymer rubbers differing in, for example, density, are preferably used from the viewpoint of further improving the impact resistance, tensile elongation, and rigidity of the resin composition. For example, an ethylene-α-olefin copolymer rubber having a density of 0.857 g/cm$^3$ and an ethylene-α-olefin copolymer rubber having a density of 0.870 g/cm$^3$ can be used in combination from the viewpoint of the impact resistance, tensile elongation at break, and rigidity of the resin composition.

The melt flow rate (MFR; measured under a load of 2.16 kg at 190° C. according to ASTM D-1238) of the component (d) alone is preferably 0.1 to 4.5 g/10 min, more preferably 0.3 to 3 g/10 min, from the viewpoint of the stabilization of morphology by the dispersion of the component (d) into the resin composition, and the impact resistance of the resin composition.

Examples of the method for controlling the melt flow rate of the component (d) within the aforementioned range include, but are not particularly limited to, a method of adjusting the polymerization temperature and the polymerization pressure in the production of the component (d), and a method of adjusting the molar ratio between the monomer concentrations of ethylene and an α-olefin and the hydrogen concentration in the polymerization system.

The molecular weight distribution (Mw/Mn; Mw represents a weight-average molecular weight, and Mn represents a number-average molecular weight) of the component (d) is not particularly limited and is preferably 1.3 to 5.0.

When the component (d) has MFR of 0.1 to 4.5 g/10 min and a shore A hardness of 75 or smaller, the ethylene-α-olefin copolymer rubber (d) in the resin composition is a component that plays an absolute role as an impact resistance-imparting agent between two or more resins selected from the group consisting of the polypropylene-based resin (a), the polyphenylene ether-based resin (b), and the first hydrogenated block copolymer-based resin (c).

When the content of the vinyl aromatic compound units in the first hydrogenated block copolymer-based resin (c) is set to 30 to 50% by mass and the shore A hardness of the ethylene-α-olefin copolymer rubber (d) is set to 75 or smaller, this imparts a favorable emulsified and dispersed state to the polyphenylene ether-based resin (b) in the emulsification and dispersion between the polypropylene-based resin (a) and the polyphenylene ether-based resin (b), and imparts great superiority to the tensile elongation and impact resistance of the resulting resin composition.

[Component (e)]

Preferably, the resin composition of the present embodiment further contains (e) at least one second hydrogenated block copolymer-based resin different from the component (c) from the viewpoint of improvement in impact resistance. More preferably, the resin composition of the present embodiment contains the component (d) and the component (e) from the viewpoint of tensile elongation and low-temperature impact resistance. The second hydrogenated block copolymer-based resin (e) (hereinafter, also referred to as a "component (e)") used in the present embodiment is (e1) a second hydrogenated block copolymer and/or (e2) a second modified hydrogenated block copolymer mentioned later.

<Component (e1)>

The second hydrogenated block copolymer (e1) is a hydrogenated block copolymer prepared by hydrogenating a block copolymer containing at least one polymer block A composed mainly of a vinyl aromatic compound and at least one polymer block B composed mainly of a conjugated diene compound, wherein the total ratio of a 1,2-vinyl bond and a 3,4-vinyl bond to all bonds in the conjugated diene compound units (hydrogenated block copolymer-constituting units derived from the conjugated diene compound) is 25% or more and less than 60%. In the component (e1), the rate of hydrogenation of ethylenic double bonds (double bonds in the conjugated diene compound units) in the block copolymer is 10% or higher and lower than 80%.

The total ratio of a 1,2-vinyl bond and a 3,4-vinyl bond to all bonds in the conjugated diene compound units in the component (e1) is 25% or more and less than 60%, preferably 25 to 55%, more preferably 30 to 50%.

When the total ratio of a 1,2-vinyl bond and a 3,4-vinyl bond is less than 60%, the resulting resin composition has improved impact resistance at low temperatures. The component (e1) in which the total ratio of a 1,2-vinyl bond and a 3,4-vinyl bond is 25% or more is preferred from the viewpoint of improving compatibility with the component (a) in combined use with the component (c).

Examples of the method for controlling the total ratio of a 1,2-vinyl bond and a 3,4-vinyl bond within the aforementioned range include, but are not particularly limited to, a method of adding an adjuster of the amount of the 1,2-vinyl bond in the production of the component (e1), and a method of adjusting the polymerization temperature.

As in the component (c), the "total amount of vinyl bonds to the amount of all bonds (the total ratio of a 1,2-vinyl bond and a 3,4-vinyl bond to all bonds) in the conjugated diene compound" refers to the amount of vinyl bonds in the block copolymer before hydrogenation of the hydrogenated block copolymer-based resin. This can be measured, for example, by applying the block copolymer before hydrogenation to an infrared spectrophotometer and calculated by the Hampton technique. Alternatively, this value can be calculated from the block copolymer after hydrogenation by use of NMR.

(Structure of Second Hydrogenated Block Copolymer (e1))

Examples of the structure of the second hydrogenated block copolymer (e1) include, but are not particularly limited to, A-B type, A-B-A type, B-A-B-A type, (A-B-)n-X type (wherein n represents an integer of 1 or larger, and X represents a reaction residue of a polyfunctional coupling agent such as silicon tetrachloride or tin tetrachloride, or a residue of an initiator such as a polyfunctional organic lithium compound), and A-B-A-B-A type structures wherein "A" represents the polymer block A, and "B" represents the polymer block B. Referring to the block structure, the polymer block B composed mainly of a conjugated diene compound preferably has a structure of a homopolymer block of the conjugated diene compound or a copolymer block of the conjugated diene compound and a vinyl aromatic compound containing more than 50% by mass, preferably 70% by mass or larger, of this conjugated diene compound. The polymer block A composed mainly of a vinyl aromatic compound preferably has a structure of a homopolymer block of the vinyl aromatic compound or a copolymer block of the vinyl aromatic compound and a conjugated diene compound containing more than 50% by mass, preferably 70% by mass or larger, of this vinyl aromatic compound.

(Polymer Block A)

The polymer block A composed mainly of a vinyl aromatic compound is a homopolymer block of the vinyl aromatic compound or a copolymer block of the vinyl aromatic compound and a conjugated diene compound. The phrase "composed mainly of a vinyl aromatic compound" for the polymer block A means that the polymer block A contains more than 50% by mass of the vinyl aromatic compound units. The polymer block A preferably contains 70% by mass or larger of the vinyl aromatic compound units.

Examples of the vinyl aromatic compound include, but are not particularly limited to, styrene, α-methylstyrene, vinyltoluene, p-tert-butylstyrene, and diphenylethylene. One of these vinyl aromatic compounds may be used alone, or two or more thereof may be used. Among them, styrene is preferred. Examples of the conjugated diene compound include compounds mentioned later. One of these compounds may be used alone, or two or more thereof may be used.

(Polymer Block B)

The polymer block B composed mainly of a conjugated diene compound is a homopolymer block of the conjugated diene compound or a random copolymer block of the conjugated diene compound and a vinyl aromatic compound. The phrase "composed mainly of a conjugated diene compound" for the polymer block B means that the polymer block B contains more than 50% by mass of the conjugated diene compound units. The polymer block B preferably contains 70% by mass or larger of the conjugated diene compound units.

Examples of the conjugated diene compound include, but are not particularly limited to, butadiene, isoprene, 1,3-pentadiene, and 2,3-dimethyl-1,3-butadiene. One of these conjugated diene compounds may be used alone, or two or more thereof may be used. Among them, butadiene, isoprene or a combination thereof is preferred. Examples of the vinyl aromatic compound include the compounds mentioned above. One of these compounds may be used alone, or two or more thereof may be used.

The polymer block B may be a polymer block of single conjugated diene compound units in which the ratio of the total amount of vinyl bonds to the amount of all bonds is 25% or more and less than 60%, or may be a polymer block B composed mainly of conjugated diene compounds having both of at least one polymer block B1 composed mainly of a conjugated diene compound in which the ratio of the total amount of vinyl bonds is 25 to 45% and at least one polymer block B2 composed mainly of a conjugated diene compound in which the ratio of the total amount of vinyl bonds is 45% or more and less than 70%. The block copolymer exhibiting such a block structure is represented by, for example, A-B2-B1-A wherein "A" represents the polymer block A, "B1" represents the polymer block B1, and "B2" represents the polymer block B2. This block copolymer can be obtained by a polymerization method known in the art for controlling the total amount of vinyl bonds on the basis of the adjusted feed sequence of each monomer unit.

(Structure of Block Copolymer)

The molecular structure of the block copolymer containing the polymer block A and the polymer block B is not particularly limited and may be, for example, linear, branched, radial, or any combination thereof. The polymer block A and the polymer block B may each be a polymer block constituted by random distribution, tapered distribution (in which the monomer components are increased or decreased along with the molecular chain), or partially block distribution of the vinyl aromatic compound and the conjugated diene compound, or any combination thereof in the molecular chain. When two or more polymer blocks A or polymer blocks B are present in the component (e1), these polymer blocks may have the same structures or may have different structures.

In the block copolymer, the ratio of the total amount of vinyl bonds to the amount of all bonds in the conjugated diene compound is preferably 25% or more and less than 60%, more preferably 25 to 55%, further preferably 30 to 50%. When the ratio of the total amount of vinyl bonds is less than 60%, the resulting resin composition has improved impact resistance at low temperatures.

(Rate of Hydrogenation)

In the second hydrogenated block copolymer (e1), the rate of hydrogenation of ethylenic double bonds (double bonds in the conjugated diene compound units) in the block copolymer is 10% or higher and lower than 80%, preferably 10 to 60%, more preferably 20 to 50%. The rate of hydrogenation that falls within this range is preferred because the resulting resin composition has improved low-temperature impact resistance. The component (e1) having such a rate of hydrogenation is readily obtained, for example, by controlling the amount of hydrogen consumption within a range that achieves the desired rate of hydrogenation (e.g., 10% or higher and lower than 80%) in the hydrogenation reaction of ethylenic double bonds in the block copolymer.

(Production Method)

The method for producing the second hydrogenated block copolymer (e1) is not particularly limited, and a production method known in the art can be used. Examples of the production method known in the art include, but are not particularly limited to, methods described in Japanese Patent Laid-Open No. 47-11486, Japanese Patent Laid-Open No. 49-66743, Japanese Patent Laid-Open No. 50-75651, Japanese Patent Laid-Open No. 54-126255, Japanese Patent Laid-Open No. 56-10542, Japanese Patent Laid-Open No. 56-62847, Japanese Patent Laid-Open No. 56-100840, Japanese Patent Laid-Open No. 2-300218, U.K. Patent No. 1130770, U.S. Pat. No. 3,281,383, U.S. Pat. No. 3,639,517, U.K. Patent No. 1020720, U.S. Pat. No. 3,333,024, and U.S. Pat. No. 4,501,857.

The second hydrogenated block copolymer (e1) in which the ratio of the total amount of vinyl bonds to the amount of all bonds in the conjugated diene compound is less than 60% and/or its rate of hydrogenation is lower than 80% is more preferred because the resulting resin composition has improved impact resistance at low temperatures.

(Content of Vinyl Aromatic Compound Unit in Component (e1))

The second hydrogenated block copolymer (e1) preferably contains 20 to 70% by mass of the vinyl aromatic compound units (hydrogenated block copolymer-constituting units derived from the vinyl aromatic compound). One component (e1) having the content of the vinyl aromatic compound units within this range may be used, or two or more components (e1) differing in the content of the vinyl aromatic compound units may be used in combination.

<Component (e2)>

The second modified hydrogenated block copolymer (e2) refers to, for example, a modified hydrogenated block copolymer obtained by reacting the second hydrogenated block copolymer (e1) with an $\alpha,\beta$-unsaturated carboxylic acid or a derivative thereof (ester compound or acid anhydride compound) in a melted state, a solution state, or a slurry state at 80 to 350° C. in the presence or absence of a radical generating agent. In this case, the $\alpha,\beta$-unsaturated carboxylic acid or the derivative thereof is preferably grafted or added at a rate of 0.01 to 10% by mass to the second hydrogenated block copolymer (e1).

In the case of using the second hydrogenated block copolymer (e1) and the second modified hydrogenated block copolymer (e2) in combination, the mixing ratio between the second hydrogenated block copolymer (e1) and the second modified hydrogenated block copolymer (e2) in the second hydrogenated block copolymer-based resin (e) can be determined without particular limitations.

<Number-Average Molecular Weight>

The number-average molecular weight (Mne) of the component (e) is preferably 5,000 to 1,000,000, more preferably 100,000 or smaller. When the Mne is 1,000,000 or smaller, the role of the second hydrogenated block copolymer-based resin (e) in the resin composition tends to be an absolute role as an impact resistance-imparting agent between two or more resins selected from the group consisting of the polypropylene-based resin (a), the polyphenylene ether-based resin (b), and the first hydrogenated block copolymer-based resin (c). Specifically, for favorably diffusing the second hydrogenated block copolymer-based resin (e) as an impact resistance-imparting agent in the melt mixing system for the emulsification in a melted bulk state of polymer (polypropylene)-polymer (polyphenylene ether)-polymer (first hydrogenated block copolymer) having a high viscosity, the number-average molecular weight (Mne) of the component (e) is preferably 5,000 to 1,000,000, more preferably 100,000 or smaller in consideration of the melt viscosity of the second hydrogenated block copolymer-based resin (e).

Examples of the method for controlling the number-average molecular weight (Mne) of the component (e) within the aforementioned range include, but are not particularly limited to, a method of adjusting the amount of the catalyst in the polymerization step for the component (e).

In the present embodiment, the number-average molecular weight (Mne) of the component (e) can be measured using Gel Permeation Chromatography System 21 manufactured by Showa Denko K.K. under conditions given below. In the measurement, the column used is one K-G, one K-800RL, and one K-800R (all manufactured by Showa Denko K.K.) connected in series in this order. The column temperature is set to 40° C. Chloroform is used as a solvent. The solvent flow rate is set to 10 mL/min. The sample concentration is set to 1 g of a hydrogenated block copolymer/L of a chloroform solution. A calibration curve is prepared using standard polystyrenes (the standard polystyrenes have molecular weights of 3650000, 2170000, 1090000, 681000, 204000, 52000, 30200, 13800, 3360, 1300, and 550). In the measurement, the UV (ultraviolet) wavelength of the detection unit is set to 254 nm both for the standard polystyrenes and for the hydrogenated block copolymer.

When the component (e) has, for example, an A-B-A type structure, the number-average molecular weight (MneA) of the polymer block A constituting the second hydrogenated block copolymer-based resin (e) can be determined on the basis of the aforementioned number-average molecular weight (Mne) of the component (e) according to the expression (MneA)=(Mne)×Ratio of the amount of the bound vinyl aromatic compounds/2 on the precondition that the molecular weight distribution of the component (e) is 1 and the two polymer block A each composed mainly of a vinyl aromatic compound have the same molecular weights. Likewise, when the component (e) is an A-B-A-B-A type hydrogenated block copolymer, the MneA can be determined according to the expression (MneA)=(Mne)×Ratio of the amount of the bound vinyl aromatic compounds/3. If the block structure A and the block structure B described above have known sequences at the stage of synthesizing the vinyl aromatic compound-conjugated diene compound block copolymer, the MneA may be calculated from the proportion of the block structure A on the basis of the measured number-average molecular weight (Mne) of the component (e) without depending on the aforementioned expressions.

The number-average molecular weight (MneA) of the polymer block A constituting the component (e) is preferably 5,000 to 25,000, more preferably 5,000 to 14,000.

<Content of Vinyl Aromatic Compound Unit>

The content of the vinyl aromatic compound units (hydrogenated block copolymer-constituting units derived from the vinyl aromatic compound) in the component (e) is preferably 20 to 70% by mass, more preferably 20 to 60% by mass, further preferably 20 to 40% by mass. When the content of the vinyl aromatic compound units in the component (e) is 20% by mass or larger, the resulting resin composition tends to have improved mechanical strength. When the content of the vinyl aromatic compound units is 70% by mass or smaller, the resulting resin composition tends to be excellent in the balance between heat resistance and impact resistance.

[Content Ratio of Each Component]

When the resin composition of the present embodiment contains the component (d), the mass ratio between the first hydrogenated block copolymer-based resin (c) and the ethylene-$\alpha$-olefin copolymer rubber (d) ((c):(d)) is preferably 1:99 to 99:1, more preferably 10:90 to 90:10, further preferably 20:80 to 80:20, particularly preferably 30:70 to 70:30, from the viewpoint of obtaining a polymer alloy containing the polyphenylene ether-based resin (b) in a stable emulsified and dispersed states in a matrix containing the polypropylene-based resin (a).

In the resin composition of the present embodiment, the total content of the components (c) and (d) is preferably 1 to 50 parts by mass, more preferably 2 to 45 parts by mass, further preferably 3 to 40 parts by mass, particularly preferably 10 to 30 parts by mass, with respect to the total content (100 parts by mass) of the components (a) and (b). When the total content of the components (c) and (d) falls within this range, the resulting resin composition tends to be excellent in heat resistance and impact resistance.

When the resin composition of the present embodiment contains the component (e), the mass ratio between the first hydrogenated block copolymer-based resin (c) and the second hydrogenated block copolymer-based resin (e) that can be used in combination therewith ((c):(e)) is preferably 1:99 to 99:1, more preferably 10:90 to 90:10, further preferably 20:80 to 80:20, particularly preferably 30:70 to 70:30, from the viewpoint of obtaining a polymer alloy containing the polyphenylene ether-based resin (b) in a stable emulsified and dispersed states in a matrix containing the polypropylene-based resin (a).

In the resin composition of the present embodiment, the total content of the components (c) and (e) is preferably 1 to 50 parts by mass, more preferably 2 to 45 parts by mass, further preferably 3 to 40 parts by mass, particularly preferably 10 to 30 parts by mass, with respect to the total content (100 parts by mass) of the components (a) and (b). The total content of the components (c) and (e) that falls within this range is preferred from the viewpoint of the heat resistance of the resin composition.

In the resin composition of the present embodiment, the mass ratio between the components (a) and (b) ((a):(b)) is preferably 25:75 to 99:1, more preferably 27:73 to 95:5, further preferably 26:74 to 92:8, particularly preferably 30:70 to 50:50. The mass ratio between the components (a) and (b) that falls within this range is preferred from the viewpoint of the heat resistance and impact resistance of the resin composition.

[Component (f)]

The resin composition of the present embodiment may further contain (f) a third hydrogenated block copolymer-based resin (hereinafter, also referred to as a "component (f)") as an optional component from the viewpoint of improvement in impact resistance.

In the resin composition of the present embodiment, the content of the component (f) is preferably 1 to 15 parts by mass, more preferably 2 to 12 parts by mass, further preferably 3 to 10 parts by mass, with respect to the total content (100 parts by mass) of the components (a) and (b).

In the case of using the components (e) and (f) in combination in the resin composition of the present embodiment, the mass ratio between the components (e) and (f) ((e):(f)) is preferably 10:90 to 90:10, more preferably 20:80 to 80:20, further preferably 30:70 to 70:30.

The component (f) used in the present embodiment is (f1) a third hydrogenated block copolymer and/or (f2) a third modified hydrogenated block copolymer mentioned later.

<Component (f1)>

The third hydrogenated block copolymer (f1) is a hydrogenated block copolymer prepared by hydrogenating a block copolymer containing at least one polymer block A composed mainly of a vinyl aromatic compound and at least one polymer block B composed mainly of a conjugated diene compound, wherein the third hydrogenated block copolymer (f1) contains 10% by mass or larger and smaller than 30% by mass of the vinyl aromatic compound units (hydrogenated block copolymer-constituting units derived from the vinyl aromatic compound), and the total ratio of a 1,2-vinyl bond and a 3,4-vinyl bond to all bonds in the conjugated diene compound units (hydrogenated block copolymer-constituting units derived from the conjugated diene compound) is 25% or more and less than 70%. In the component (f), the rate of hydrogenation of ethylenic double bonds (double bonds in the conjugated diene compound units) in the block copolymer is 80 to 100%. The number-average molecular weight (MnfA) of the polymer block A constituting the component (f1) is preferably 4,000 to 8,000.

The total ratio of a 1,2-vinyl bond and a 3,4-vinyl bond to all bonds in the conjugated diene compound units in the component (f1) is 25% or more and less than 70%, preferably 30 to 60%, more preferably 40 to 60%, further preferably 40 to 55%.

When the total ratio of a 1,2-vinyl bond and a 3,4-vinyl bond to all bonds in the conjugated diene compound units in the component (f1) falls within this range, the resulting resin composition has improved tensile elongation and impact resistance at low temperatures.

Examples of the method for controlling the total ratio of a 1,2-vinyl bond and a 3,4-vinyl bond within the aforementioned range include, but are not particularly limited to, a method of adding an adjuster of the amount of the 1,2-vinyl bond in the production of the component (f1), and a method of adjusting the polymerization temperature.

In the present embodiment, the total ratio of a 1,2-vinyl bond and a 3,4-vinyl bond can be measured using an infrared spectrophotometer.

(Structure of Third Hydrogenated Block Copolymer (f1))

Examples of the structure of the third hydrogenated block copolymer (f1) include, but are not particularly limited to, hydrogenated products of a vinyl aromatic compound-conjugated diene block copolymer having a structure in which block units are bonded, for example, A-B-A type, A-B-A-B type, (A-B-)n-X type (wherein n represents an integer of 1 or larger, and X represents a reaction residue of a polyfunctional coupling agent such as silicon tetrachloride or tin tetrachloride, or a residue of an initiator such as a polyfunctional organic lithium compound), or A-B-A-B-A type wherein "A" represents the polymer block A, and "B" represents the polymer block B. Among them, a hydrogenated block copolymer having an A-B-A-B type structure is more preferred because this block copolymer is superior in flowability to a hydrogenated block copolymer having an A-B-A type structure.

(Polymer Block A)

The polymer block A composed mainly of a vinyl aromatic compound is a homopolymer block of the vinyl aromatic compound or a copolymer block of the vinyl aromatic compound and a conjugated diene compound. The phrase "composed mainly of a vinyl aromatic compound" for the polymer block A means that the polymer block A contains more than 50% by mass of the vinyl aromatic compound units. The polymer block A preferably contains 70% by mass or larger of the vinyl aromatic compound units.

Examples of the vinyl aromatic compound include, but are not particularly limited to, styrene, α-methylstyrene, vinyltoluene, p-tert-butylstyrene, and diphenylethylene. One of these vinyl aromatic compounds may be used alone, or two or more thereof may be used. Among them, styrene is preferred. Examples of the conjugated diene compound include compounds mentioned later. One of these compounds may be used alone, or two or more thereof may be used.

(Polymer Block B)

The polymer block B composed mainly of a conjugated diene compound is a homopolymer block of the conjugated diene compound or a random copolymer block of the conjugated diene compound and a vinyl aromatic compound. The phrase "composed mainly of a conjugated diene compound" for the polymer block B means that the polymer block B contains more than 50% by mass of the conjugated diene compound units. The polymer block B preferably contains 70% by mass or larger of the conjugated diene compound units.

Examples of the conjugated diene compound include, but are not particularly limited to, butadiene, isoprene, 1,3-pentadiene, and 2,3-dimethyl-1,3-butadiene. One of these conjugated diene compounds may be used alone, or two or more thereof may be used. Among them, butadiene, isoprene or a combination thereof is preferred. Examples of the vinyl aromatic compound include the compounds mentioned above. One of these compounds may be used alone, or two or more thereof may be used.

The polymer block B may be a polymer block of single conjugated diene compound units in which the ratio of the total amount of vinyl bonds to the amount of all bonds is 25% or more and less than 70%, or may be a polymer block B composed mainly of conjugated diene compounds having both of at least one polymer block B1 composed mainly of a conjugated diene compound in which the ratio is 25 to 45% and at least one polymer block B2 composed mainly of a conjugated diene compound in which the ratio is 45% or more and less than 70%. The block copolymer exhibiting such a block structure is represented by, for example, A-B2-B1-A wherein "A" represents the polymer block A, "B1" represents the polymer block B1, and "B2" represents the polymer block B2. This block copolymer can be obtained by a polymerization method known in the art for controlling the total amount of vinyl bonds on the basis of the adjusted feed sequence of each monomer unit.

(Structure of Block Copolymer)

The block copolymer is preferably a vinyl aromatic-conjugated diene compound block copolymer having a structure in which block units are bonded, for example, A-B-A type, A-B-A-B type, B-A-B-A type, (A-B-)n-X type (wherein n represents an integer of 1 or larger, and X represents a reaction residue of a polyfunctional coupling agent such as silicon tetrachloride or tin tetrachloride, or a residue of an initiator such as a polyfunctional organic lithium compound), or A-B-A-B-A type wherein "A" represents the polymer block A, and "B" represents the polymer block B. Among them, a block copolymer having an A-B-A-B type or B-A-B-A type structure is more preferred because this block copolymer is superior in flowability as the component (f1) to a block copolymer having an A-B-A type structure.

The molecular structure of the block copolymer containing the polymer block A and the polymer block B is not particularly limited and may be, for example, linear, branched, radial, or any combination thereof. The polymer block A and the polymer block B may each be a polymer block constituted by random distribution, tapered distribution (in which the monomer components are increased or decreased along with the molecular chain), or partially block distribution of the vinyl aromatic compound and the conjugated diene compound, or any combination thereof in the molecular chain. When two or more polymer blocks A or polymer blocks B are present in the component (f1), these polymer blocks may have the same structures or may have different structures.

In the block copolymer, the ratio of the total amount of vinyl bonds to the amount of all bonds in the conjugated diene compound units is preferably 25% or more and less than 70%, more preferably 30 to 60%, further preferably 40 to 60%, particularly preferably 40 to 55%.

(Rate of Hydrogenation)

In the third hydrogenated block copolymer (f1), the rate of hydrogenation of ethylenic double bonds (double bonds in the conjugated diene compound units) in the block copolymer is 80 to 100%, preferably 90% or higher, more preferably 95% or higher. When the rate of hydrogenation falls within this range, the resulting resin composition can have favorable heat resistance and weather resistance.

Examples of the method for controlling the rate of hydrogenation within the aforementioned range include, but are not particularly limited to, a method of controlling the amount of hydrogen consumption within a range that achieves the desired rate of hydrogenation in the hydrogenation reaction of ethylenic double bonds in the block copolymer.

In the present embodiment, the rate of hydrogenation can be measured by nuclear magnetic resonance (NMR). Specifically, the rate of hydrogenation can be measured by a method described in Examples mentioned later.

(Production Method)

The method for producing the third hydrogenated block copolymer (f1) is not particularly limited, and a production method known in the art can be used. Examples of the production method known in the art include, but are not particularly limited to, methods described in Japanese Patent Laid-Open No. 47-11486, Japanese Patent Laid-Open No. 49-66743, Japanese Patent Laid-Open No. 50-75651, Japanese Patent Laid-Open No. 54-126255, Japanese Patent Laid-Open No. 56-10542, Japanese Patent Laid-Open No. 56-62847, Japanese Patent Laid-Open No. 56-100840, Japanese Patent Laid-Open No. 2-300218, U.K. Patent No. 1130770, U.S. Pat. No. 3,281,383, U.S. Pat. No. 3,639,517, U.K. Patent No. 1020720, U.S. Pat. No. 3,333,024, and U.S. Pat. No. 4,501,857.

<Component (f2)>

The third modified hydrogenated block copolymer (f2) refers to, for example, a modified hydrogenated block copolymer obtained by reacting the third hydrogenated block copolymer (f1) with an α,β-unsaturated carboxylic acid or a derivative thereof (ester compound or acid anhydride compound) in a melted state, a solution state, or a slurry state at 80 to 350° C. in the presence or absence of a radical generating agent. In this case, the α,β-unsaturated carboxylic acid or the derivative thereof is preferably grafted or added at a rate of 0.01 to 10% by mass to the third hydrogenated block copolymer (f1).

In the case of using the third hydrogenated block copolymer (f1) and the third modified hydrogenated block copolymer (f2) in combination, the mixing ratio between the third hydrogenated block copolymer (f1) and the third modified hydrogenated block copolymer (f2) in the third hydrogenated block copolymer-based resin (f) can be determined without particular limitations.

<Number-Average Molecular Weight>

The number-average molecular weight (Mnf) of the component (f) is preferably 5,000 to 1,000,000, more preferably 100,000 or smaller. When the Mnf is 1,000,000 or smaller, the role of the third hydrogenated block copolymer-based resin (f) in the resin composition tends to be an absolute role as an impact resistance-imparting agent between two or more resins selected from the group consisting of the polypropylene-based resin (a), the polyphenylene ether-based resin (b), and the hydrogenated block copolymer-based resin (c). Specifically, for favorably diffusing the third hydrogenated block copolymer-based resin (f) as an impact resistance-imparting agent in the melt mixing system for the emulsification in a melted bulk state of polymer (polypropylene)-polymer (polyphenylene ether)-polymer (hydrogenated block copolymer) having a high viscosity, the number-average molecular weight (Mnf) of the component (f) is preferably 5,000 to 1,000,000, more preferably 100,000 or smaller in consideration of the melt viscosity of the third hydrogenated block copolymer-based resin (f).

Examples of the method for controlling the number-average molecular weight (Mnf)) of the component (f) within the aforementioned range include, but are not particularly limited to, a method of adjusting the amount of the catalyst in the polymerization step for the component (f).

In the present embodiment, the number-average molecular weight (Mnf) of the component (f) can be measured using Gel Permeation Chromatography System 21 manufactured by Showa Denko K.K. under conditions given below. In the measurement, the column used is one K-G, one K-800RL, and one K-800R (all manufactured by Showa Denko K.K.) connected in series in this order. The column temperature is set to 40° C. Chloroform is used as a solvent. The solvent flow rate is set to 10 mL/min. The sample concentration is set to 1 g of a hydrogenated block copolymer/L of a chloroform solution. A calibration curve is prepared using standard polystyrenes (the standard polystyrenes have molecular weights of 3650000, 2170000, 1090000, 681000, 204000, 52000, 30200, 13800, 3360, 1300, and 550). In the measurement, the UV (ultraviolet) wavelength of the detection unit is set to 254 nm both for the standard polystyrenes and for the hydrogenated block copolymer.

When the component (f) has, for example, an A-B-A type structure, the number-average molecular weight (MnfA) of the polymer block A constituting the third hydrogenated block copolymer-based resin (f) can be determined on the basis of the aforementioned number-average molecular weight (Mnf) of the component (f) according to the expression (MnfA)=(Mnf)×Ratio of the amount of the bound vinyl aromatic compounds/2 on the precondition that the molecular weight distribution of the component (f) is 1 and the two polymer block A each composed mainly of a vinyl aromatic compound have the same molecular weights. Likewise, when the component (f) is an A-B-A-B-A type hydrogenated block copolymer, the MnfA can be determined according to the expression (MnfA)=(Mnf))×Ratio of the amount of the bound vinyl aromatic compounds/3. If the block structure A and the block structure B described above have known sequences at the stage of synthesizing the vinyl aromatic compound-conjugated diene compound block copolymer, the MnfA may be calculated from the proportion of the block structure A on the basis of the measured number-average molecular weight (Mnf)) of the component (f) without depending on the aforementioned expressions.

The number-average molecular weight (MnfA) of the polymer block A constituting the component (f) is preferably 4,000 to 8,000, more preferably 4,500 to 7,000.

The third hydrogenated block copolymer-based resin (f) in which the number-average molecular weight (MnfA) of the polymer block A composed mainly of a vinyl aromatic compound is 4,000 to 8,000 has the function of conferring favorable impact resistance and can impart great superiority to the impact resistance of the resulting resin composition.

Examples of the method for controlling the number-average molecular weight (Mnf A) within the aforementioned range include, but are not particularly limited to, a method for adjusting the number-average molecular weight by the amount of a polymerization initiator.

<Content of Vinyl Aromatic Compound Unit>

The content of the vinyl aromatic compound units (hydrogenated block copolymer-constituting units derived from the vinyl aromatic compound) in the component (f) is preferably 10% by mass or larger and smaller than 30% by mass, preferably 12 to 25% by mass, more preferably 13 to 22% by mass. When the content of the vinyl aromatic compound units in the component (f) is 10% by mass or larger, the resulting resin composition tends to have improved mechanical strength. When the content of the vinyl aromatic compound units is smaller than 30% by mass, the resulting resin composition tends to be excellent in the balance between heat resistance and impact resistance.

[Morphology]

The resin composition of the present embodiment preferably has a matrix phase containing the component (a) and a dispersed phase containing the component (b). Such morphology can be confirmed using a transmission electron microscope.

The matrix phase may be constituted by the component (a) alone. The dispersed phase may be constituted by the component (b) alone or may be constituted by, for example, the component (b), the component (c), and the component (d) and/or the component (e). In this case, the resin composition of the present embodiment has the matrix phase (component (a)) and dispersed particles constituting the dispersed phase (the component (b) alone or the component (b), the component (c), and the component (d) and/or the component (e), etc.). The component (c) and the component (d) and/or the component (e) may not only be included in the dispersed phase, but may be included in the matrix phase without impairing the effects of the present embodiment. In the resin composition of the present embodiment having such morphology, the component (c) and the component (d) and/or the component (e) contained in the matrix phase and/or the dispersed phase can assume a dispersed state more effective for improvement in impact resistance, presumably further improving the effects of the present embodiment (however, the effects of the present embodiment are not limited thereto).

[Additional Component (h)]

In the resin composition of the present embodiment, a mixture of the polyphenylene ether-based resin (b) and at least one compound selected from the group consisting of polystyrene, syndiotactic polystyrene, and high-impact polystyrene can also be preferably used.

More preferably, a mixture can be used in which at least one compound selected from the group consisting of polystyrene, syndiotactic polystyrene, and high-impact polystyrene is mixed in the range of preferably 400 parts by mass or smaller, more preferably 100 parts by mass or smaller, further preferably 50 parts by mass or smaller, particularly preferably 10 parts by mass or smaller, with respect to 100 parts by mass of the polyphenylene ether-based resin (b).

The resin composition of the present embodiment may be supplemented, if necessary, with other additional components, in addition to the components described above, without impairing the effects of the present embodiment. Examples of such other additional components include, but are not particularly limited to, vinyl aromatic compound-conjugated diene compound block copolymers, vinyl aromatic compound-conjugated diene compound hydrogenated block copolymers other than the components (c), (e), and (f), olefin-based elastomers other than the component (d), antioxidants, metal deactivators, heat stabilizers, flame retardants (organic phosphoric acid ester compounds, ammonium polyphosphate compounds, melamine polyphosphate compounds, phosphinates, magnesium hydroxide, aromatic halogen-based flame retardants, silicone-based flame retardants, etc.), fluorine-based polymers, plasticizers (low-molecular-weight polyethylene, epoxidized soybean oil, polyethylene glycol, fatty acid esters, etc.), flame retardant promoters such as antimony trioxide, weather (light) resistance-improving agents, nucleating agents for polyolefin, slip agents, inorganic or organic fillers or reinforcing materials (chopped strand glass fibers, long glass fibers, long CF fibers, polyacrylonitrile fibers, glass flakes, glass beads, carbon black, titanium oxide, calcium carbonate, talc, mica, whisker, clay, magnesium hydroxide, magnesium sulfate and fibers thereof, silica, wollastonite, conductive metal fibers, conductive carbon black, etc.), various colorants, and mold release agents.

[Loss Tangent (Tan δ)]

In the resin composition according to the present embodiment, the ratio of a loss tangent at −50° C. (−50° C. tan δ) to a loss tangent at 0° C. (0° C. tan δ) (−50° C. tan δ/0° C. tan δ) obtained by the following measurement method is preferably 0.39 or more, more preferably 0.41 or more, further preferably 0.42 or more.

<Measurement of Loss Tangent (Tan δ)>

The loss tangent (tan δ) of an ISO test piece obtained from the resin composition is measured at −50° C. and 0° C. using a viscoelasticity measuring machine at a tensile mode under temperature sweep conditions involving an oscillation frequency of 10 Hz, a strain of 0.2% under static stress, a strain of 0.1% under dynamic stress, a contact load of 0.5 N, a rate of temperature rise of 3° C./min, and a temperature range of −100° C. to 160° C.

A higher value of this ratio (−50° C. tan δ/0° C. tan δ) is more preferred. The upper limit is, for example, 1.50. The ratio (−50° C. tan δ/0° C. tan δ) can be set to 0.39 or more to thereby improve the low-temperature impact resistance of the resin composition at 0° C. or lower.

When the resin composition according to the present embodiment contains the component (e), the ratio of a loss tangent at −45° C. (−45° C. tan δ) to a loss tangent at 0° C. (0° C. tan δ) (−45° C. tan δ/0° C. tan δ) obtained by the following measurement method is preferably 0.41 or more, more preferably 0.45 or more, further preferably 0.50 or more.

<Measurement of Loss Tangent (Tan δ)>

The loss tangent (tan δ) of an ISO test piece obtained from the resin composition is measured at −45° C. and 0° C. using a viscoelasticity measuring machine at a tensile mode under temperature sweep conditions involving an oscillation frequency of 10 Hz, a strain of 0.2% under static stress, a strain of 0.1% under dynamic stress, a contact load of 0.5 N, a rate of temperature rise of 3° C./min, and a temperature range of −100° C. to 160° C.

A higher value of this ratio (−45° C. tan δ/0° C. tan δ) is more preferred. The upper limit is, for example, 1.50. The ratio (−45° C. tan δ/0° C. tan δ) can be set to 0.41 or more to thereby improve the low-temperature impact resistance of the resin composition at 0° C. or lower.

The resin composition having the ratio (−45° C. tan δ/0° C. tan δ) within the aforementioned range can be obtained, for example, by adding the particular two hydrogenated block copolymer-based resins (c) and (e) mentioned above to the polypropylene-based resin (a) and the polyphenylene ether-based resin (b).

<<Method for Producing Resin Composition>>

The resin composition of the present embodiment is obtained, for example, by melt-kneading raw materials containing the components (a) to (c) and the components (d) and/or (e) mentioned above. The melt kneading machine is not particularly limited, and a kneading machine known in the art can be used. Examples thereof include single-screw extruders, multi-screw extruders including twin-screw extruders, and heating melt kneading machines such as rolls, kneaders, Brabender Plastograph, and Banbury mixers.

Among them, a twin-screw extruder is preferred. Specifically, ZSK series manufactured by Coperion GmbH, TEM series manufactured by Toshiba Machine Co., Ltd., TEX series manufactured by The Japan Steel Works, LTD., or the like can be used.

In the case of using an extruder, the type, specification, etc., thereof is not particularly limited, and an appropriate extruder known in the art can be used. The L/D (effective length of the barrel/inner diameter of the barrel) of the extruder is preferably in the range of 20 or larger and 75 or smaller, more preferably in the range of 30 or larger and 60 or smaller.

The extruder is preferably, for example, an extruder provided with a first raw material inlet on an upstream side in the direction in which the raw materials flow, a first vacuum vent located downstream therefrom, a second raw material inlet located downstream therefrom, and a second vacuum vent located downstream therefrom, or an extruder provided with a first raw material inlet on an upstream side, a first vacuum vent located downstream therefrom, second and third raw material inlets located downstream therefrom, and a second vacuum vent located downstream therefrom.

Among them, the extruder is more preferably an extruder provided with a kneading section located upstream of the first vacuum vent, a kneading section located between the first vacuum vent and the second raw material inlet, and a kneading section located between the second raw material inlet and the second vacuum vent, or an extruder provided with a kneading section located upstream of the first vacuum vent, a kneading section located between the first vacuum vent and the second raw material inlet, a kneading section located between the second raw material inlet and the third raw material inlet, and a kneading section located between the second raw material inlet and the second vacuum vent.

The method for supplying the raw materials to the second and third raw material inlets is not particularly limited. Supply from a side opening of the extruder using a forced side feeder is more preferred than simple addition and supply from openings of the second and third raw material inlets in the extruder, because of stable supply.

The method for melt-kneading the raw materials containing the components (a) to (c) and the components (d) and/or (e) is preferably method 1 using a twin-screw extruder having a plurality of feed ports and comprising the following steps (1-1) and (1-2):

(1-1): melt-kneading the whole amount of the component (b), the partial or whole amount of the component (a), the partial or whole amount of the component (c), and the partial or whole amount of the components (d) and/or (e) (provided that at least one component selected from the group consisting of the component (a), the component (c), and the components (d) and/or (e) is used only partially); and (1-2): melt-kneading the kneaded product obtained in the step (1-1) with the remaining amount of at least one component selected from the group consisting of the component (a), the component (c), and the components (d) and/or (e).

The method for melt-kneading the raw materials containing the components (a) to (c) and the components (d) and/or (e) is more preferably method 2 using a twin-screw extruder having a plurality of feed ports and comprising the following steps (2-1) to (2-3):

(2-1): melt-kneading the whole amount of the component (b), the partial or whole amount of the component (a), and the partial or whole amount of the component (c);

(2-2): adding the remaining amount of at least one component selected from the group consisting of the component (a) and the component (c), and the partial or whole amount of the components (d) and/or (e) to the kneaded product obtained in the step (2-1), followed by melt kneading; and (2-3): adding the remaining amount of the components (d) and/or (e) to the kneaded product obtained in the step (2-2), followed by melt kneading (provided that this step is omitted when the whole amount of the components (d) and (e) is added in the step (2-2)).

The method for melt-kneading the raw materials containing the components (a) to (c) and the components (d) and/or (e) is further preferably method 3 using a twin-screw extruder having a plurality of feed ports and comprising the following steps (3-1) to (3-3):

(3-1): melt-kneading the whole amount of the component (b), the partial or whole amount of the component (a), and the partial or whole amount of the component (c);

(3-2): adding the remaining amount of at least one component selected from the group consisting of the component (a) and the component (c) to the kneaded product obtained in the step (3-1), followed by melt kneading; and (3-3): adding the whole amount of the components (d) and/or (e) to the kneaded product obtained in the step (3-2), followed by melt kneading.

The melt kneading temperature and the number of screw rotations are not particularly limited and, usually, can be appropriately selected from melt kneading temperatures of 200 to 370° C. and the numbers of screw rotations of 100 to 1200 rpm. When the raw materials include the components (e), (f), and (h), the method for adding these components is not particularly limited. The components (e) and (f) are preferably added from the second raw material inlet and/or the third raw material inlet.

<<Molded Article>>

The molded article of the present embodiment contains the resin composition described above.

The molded article of the present embodiment can be obtained, for example, by molding the resin composition described above. Examples of the molding method include, but are not particularly limited to, various conventional methods known in the art, for example, injection molding, extrusion molding, profile extrusion molding, and hollow molding. The molded article of the present embodiment obtained by such a molding method can be used as molded products of various parts, sheets, or films. Examples of these various parts include, but are not particularly limited to, automobile parts. Specifically, the molded article of the present embodiment is suitable for, for example, exterior parts such as bumpers, fenders, door panels, various moldings, emblems, engine hoods, wheel covers, roofs, spoilers, and various aero parts, and interior parts such as instrument panels, console boxes, and trims.

The molded article of the present embodiment can also be preferably used as interior and exterior parts for electrical equipment. Specific examples thereof include various computers and peripheral devices thereof, other office automation equipment, televisions, videos, cabinets for various disk players, etc., chassis, refrigerators, air conditioners, and liquid-crystal projectors. The molded article of the present embodiment is also suitable for separators of lithium ion cells for electrical equipment or electric wires or cables obtained by the covering of metal conductors or optical fibers. The molded article of the present embodiment is further suitable for use in parts such as various pump casings and boiler casings when applied to industrial parts.

EXAMPLES

Next, the present embodiment will be described more specifically with reference to Examples and Comparative Examples. However, the present embodiment is not intended to be limited by the following Examples.

The respective physical properties of materials were measured as described below.

[Number-Average Molecular Weight]

The number-average molecular weight of each component was measured by gel permeation chromatography (GPC) (mobile phase: chloroform, standard: polystyrene). Specifically, the measurement was conducted using Gel Permeation Chromatography System 21 manufactured by Showa Denko K.K. under conditions given below. In the measurement, the column used was one K-G, one K-800RL, and one K-800R (all manufactured by Showa Denko K.K.) connected in series in this order. The column temperature was set to 40° C. Chloroform was used as a solvent. The solvent flow rate was set to 10 mL/min. The sample concentration was set to 1 g of a hydrogenated block copolymer/L of a chloroform solution. A calibration curve was prepared using standard polystyrenes (the standard polystyrenes had molecular weights of 3650000, 2170000, 1090000, 681000, 204000, 52000, 30200, 13800, 3360, 1300, and 550). In the measurement, the UV (ultraviolet) wavelength of the detection unit was set to 254 nm both for the standard polystyrenes and for the hydrogenated block copolymer.

[Measurement of Amount of Bound Styrene]

The amount of bound styrene (the content of the vinyl aromatic compound units) in each hydrogenated block copolymer-based resin was measured by applying the hydrogenated block copolymer-based resin to an ultraviolet spectrophotometer (manufactured by Shimadzu Corp., UV-2450).

[Measurement of Total Amount of Vinyl Bonds]

The total amount of vinyl bonds (the total ratio of a 1,2-vinyl bond and a 3,4-vinyl bond to all bonds) in the conjugated diene compound units in each hydrogenated block copolymer-based resin was measured by applying the block copolymer before hydrogenation of the hydrogenated block copolymer-based resin to an infrared spectrophotometer (manufactured by JASCO Corp., FT/IR-230) and calculated by the Hampton technique.

[Measurement of Rate of Hydrogenation]

The rate of hydrogenation of ethylenic double bonds (double bonds in the conjugated diene compound units) in each block copolymer was measured by applying the hydrogenated block copolymer-based resin to nuclear magnetic resonance (NMR) (apparatus name: DPX-400 manufactured by Bruker Corp.).

[Melting Point]

The melting point of each component was measured using a differential scanning calorimeter.

[Melt flow rate (MFR)]

The MFR of the component (a) was measured according to JIS K7210 under conditions involving 230° C. and a load of 2.16 kg.

The MFR of the component (d) was measured according to ASTM D-1238 under conditions involving 190° C. and a load of 2.16 kg.

[Reduced Viscosity]

The reduced viscosity of the polyphenylene ether-based resin was measured under conditions involving 0.5 g/dL of a chloroform solution and 30° C.

[Shore A Hardness]

The shore A hardness of the component (d) was measured according to ASTM D-2240.

[Density]

The density of the component (d) was measured according to ASTM D-792.

[Production of Resin Composition]

1. Component (a) (Polypropylene-Based Resin)

The following components (a-1) and (a-2) were used as the component (a).

(a-1) Propylene homopolymer (melting point: 167° C., MFR: 0.4 g/10 min)

(a-2) Propylene homopolymer (melting point: 165° C., MFR: 6.0 g/10 min)

2. Component (b) (Polyphenylene Ether-Based Resin)

A polyphenylene ether homopolymer was obtained by the oxidative polymerization of 2,6-xylenol. The obtained polyphenylene ether homopolymer was used as the component (b). The polyphenylene ether homopolymer had a reduced viscosity of 0.42.

3. Component (c) (Hydrogenated Block Copolymer-Based Resin)

The following components (c-1) to (c-3) were used as the component (c), etc.

(c-1)

A hydrogenated block copolymer having a B-A-B-A type structure of hydrogenated polybutadiene-polystyrene (1)-hydrogenated polybutadiene-polystyrene (2) was synthesized by a routine method. The properties of the hydrogenated block copolymer (c-1) are shown below.

Amount of bound styrene: 43% by mass

Total amount of vinyl bonds (total ratio of a 1,2-vinyl bond and a 3,4-vinyl bond to all bonds) in the polybutadiene units in the hydrogenated block copolymer: 75%

Number-average molecular weight (Mnc): 98,000

Number-average molecular weight (MncA) of the polystyrene block (1): 20,000

Number-average molecular weight (MncA) of the polystyrene block (2): 22,000

Rate of hydrogenation of ethylenic double bonds (double bonds in the polybutadiene units) in the block copolymer: 99.9%

(c-2)

A hydrogenated block copolymer was used as the component (c-2). The amount of bound styrene in the component (c-2) was 67% by mass. The total amount of vinyl bonds in the conjugated diene compound units in the hydrogenated block copolymer was 40%.

(c-3)

A hydrogenated block copolymer was used as the component (c-3). The amount of bound styrene in the component (c-3) was 42% by mass. The total amount of vinyl bonds in the conjugated diene compound units in the hydrogenated block copolymer was 36%.

4. Component (d) (Ethylene-α-Olefin Copolymer Rubber)

The following components (d-1) to (d-4) were used as the component (d), etc.

(d-1)

Ethylene-1-octene copolymer rubber was synthesized by a routine method. The properties of the ethylene-1-octene copolymer rubber (d-1) are shown below.

Shore A hardness: 50, MFR: 1.0, density: 0.857

(d-2)

Ethylene-1-octene copolymer rubber was synthesized by a routine method. The properties of the ethylene-1-octene copolymer rubber (d-2) are shown below.

Shore A hardness: 66, MFR: 0.5, density: 0.863

(d-3)

Ethylene-1-octene copolymer rubber was synthesized by a routine method. The properties of the ethylene-1-octene copolymer rubber (d-3) are shown below.

Shore A hardness: 75, MFR: 1.0, density: 0.870

(d-4)

Ethylene-1-octene copolymer rubber was synthesized by a routine method. The properties of the ethylene-1-octene copolymer rubber (d-4) are shown below.

Shore A hardness: 75, MFR: 5.0, density: 0.870

5. Component (e) (Second Hydrogenated Block Copolymer-Based Resin)

The following components (e-1) to (e-5) were used as the component (e), etc.

(e-1)

A hydrogenated block copolymer having an A-B-A type structure of polystyrene (1)-hydrogenated polybutadiene-polystyrene (2) was synthesized by a routine method. The properties of the hydrogenated block copolymer-based resin (e-1) are shown below.

Amount of bound styrene: 30% by mass

Total amount of vinyl bonds (total ratio of a 1,2-vinyl bond and a 3,4-vinyl bond to all bonds) in the polybutadiene unit in the hydrogenated block copolymer: 41%

Rate of hydrogenation of ethylenic double bonds (double bonds in the polybutadiene unit) in the block copolymer: 43%

Number-average molecular weight (Mne): 72,000

Number-average molecular weight (MneA) of the polystyrene block (1): 10,700

Number-average molecular weight (MneA) of the polystyrene block (2): 11,000

(e-2)

A hydrogenated block copolymer having an A-B-A type structure of polystyrene (1)-hydrogenated polybutadiene-polystyrene (2) was synthesized by a routine method. The properties of the hydrogenated block copolymer-based resin (e-2) are shown below.

Amount of bound styrene: 66% by mass

Total amount of vinyl bonds (total ratio of a 1,2-vinyl bond and a 3,4-vinyl bond to all bonds) in the polybutadiene unit in the hydrogenated block copolymer: 36%

Rate of hydrogenation of ethylenic double bonds (double bonds in the polybutadiene unit) in the block copolymer: 57%

Number-average molecular weight (Mne): 61,000

Number-average molecular weight (MneA) of the polystyrene block (1): 19,000

Number-average molecular weight (MneA) of the polystyrene block (2): 21,000

(e-3)

A hydrogenated block copolymer having an A-B-A type structure of polystyrene (1)-hydrogenated polybutadiene-polystyrene (2) was synthesized by a routine method. The properties of the hydrogenated block copolymer-based resin (e-3) are shown below.

Amount of bound styrene: 64% by mass

Total amount of vinyl bonds (total ratio of a 1,2-vinyl bond and a 3,4-vinyl bond to all bonds) in the polybutadiene unit in the hydrogenated block copolymer: 75%

Rate of hydrogenation of ethylenic double bonds (double bonds in the polybutadiene unit) in the block copolymer: 68%

Number-average molecular weight (Mne): 99,000

Number-average molecular weight (MneA) of the polystyrene block (1): 32,000

Number-average molecular weight (MneA) of the polystyrene block (2): 31,000

(e-4)

A block copolymer having an A-B-A type structure of polystyrene (1)-hydrogenated polybutadiene-polystyrene (2) was synthesized by a routine method. The properties of the block copolymer-based resin (e-4) are shown below.

Amount of bound styrene: 42% by mass

Total amount of vinyl bonds (total ratio of a 1,2-vinyl bond and a 3,4-vinyl bond to all bonds) in the polybutadiene unit: 9%

Rate of hydrogenation of ethylenic double bonds (double bonds in the polybutadiene unit) in the block copolymer: 10%

Number-average molecular weight (Mne): 110,000

Number-average molecular weight (MneA) of the polystyrene block (1): 22,000

Number-average molecular weight (MneA) of the polystyrene block (2): 24,000

(e-5)

A hydrogenated block copolymer having an A-B-A type structure of polystyrene (1)-hydrogenated polybutadiene-polystyrene (2) was synthesized by a routine method. The properties of the block copolymer-based resin (e-5) are shown below.

Amount of bound styrene: 30% by mass

Total amount of vinyl bonds (total ratio of a 1,2-vinyl bond and a 3,4-vinyl bond to all bonds) in the polybutadiene unit in the hydrogenated block copolymer: 40%

Rate of hydrogenation of ethylenic double bonds (double bonds in the polybutadiene unit) in the block copolymer: 45%

Number-average molecular weight (MneA): 72,000

Number-average molecular weight (MneA) of the polystyrene block (1): 10,700

Number-average molecular weight (MneA) of the polystyrene block (2): 11,000

6. Component (f) (Third Hydrogenated Block Copolymer-Based Resin)

A hydrogenated block copolymer having an A-B-A-B type structure of polystyrene (1)-hydrogenated polybutadiene-polystyrene (2)-hydrogenated polybutadiene was synthesized by a routine method. The synthesized hydrogenated block copolymer was used as the component (f). The properties of the hydrogenated block copolymer are shown below.

Amount of bound styrene: 17% by mass

Total amount of vinyl bonds (total ratio of a 1,2-vinyl bond and a 3,4-vinyl bond to all bonds) in the polybutadiene unit in the hydrogenated block copolymer: 50%

Rate of hydrogenation of ethylenic double bonds (double bonds in the polybutadiene unit) in the block copolymer: 99.9%

Number-average molecular weight (Mnf): 65,000

Number-average molecular weight (MnfA) of the polystyrene block (1): 5,300

Number-average molecular weight (MnfA) of the polystyrene block (2): 5,700

7. Component (h) (Additional Block Copolymer-Based Resin)

(h-1)

A block copolymer having an A-B-A type structure of polystyrene (1)-polybutadiene-polystyrene (2) was synthesized by a routine method. The properties of the block copolymer (h-1) are shown below.

Amount of bound styrene: 30% by mass

Total amount of vinyl bonds (the total ratio of a 1,2-vinyl bond and a 3,4-vinyl bond to all bonds) in the polybutadiene unit: 12%

Number-average molecular weight (Mnh): 91,000

Number-average molecular weight (MnhA) of the polystyrene block (1): 13,300

Number-average molecular weight (MnhA) of the polystyrene block (2): 14,000

(h-2)

A block copolymer having an A-B-A type structure of polystyrene (1)-polybutadiene-polystyrene (2) was synthesized by a routine method. The properties of the block copolymer (h-2) are shown below.

Amount of bound styrene: 30%

Total amount of vinyl bonds (the total ratio of a 1,2-vinyl bond and a 3,4-vinyl bond to all bonds) in the polybutadiene unit: 11%

Number-average molecular weight (Mnh): 136,000

Number-average molecular weight (MnhA) of the polystyrene block (1): 20,800

Number-average molecular weight (MnhA) of the polystyrene block (2): 20,000

Examples 1 to 20 and Comparative Examples 1 to 11

A twin-screw extruder (ZSK-25 manufactured by Coperion GmbH) having the first raw material inlet, the second raw material inlet (positioned at almost the center of the extruder), and the third raw material inlet was used. Each of the components (a) to (f), etc., was supplied according to each composition shown in Tables 1 and 2 to the first to third raw material inlets of the extruder and melt-kneaded to obtain resin compositions as pellets. The twin-screw extruder was set to a barrel temperature of 270 to 320° C. and the number of screw rotations of 300 rpm. The respective physical properties of the obtained resin compositions were evaluated as described below. The measurement results are shown in Tables 1 and 2.

<Tensile Elongation>

The pellets of the resin compositions obtained in Examples and Comparative Examples were each supplied to a screw in-line type injection molding machine set to 240 to 280° C. and injection-molded under a mold temperature condition of 60° C. to prepare test pieces for tensile elongation measurement. The prepared test pieces were each left standing in an environment of 80° C. using a gear oven for 24 hours for heat history treatment. The tensile elongation of the test pieces thus receiving the heat history treatment was measured according to ISO527. In this operation, a standard deviation was calculated from the tensile elongation values of 10 test pieces. A smaller standard deviation represents more stable morphology.

<Charpy Impact Strength (Charpy)>

The pellets of the resin compositions obtained in Examples and Comparative Examples were each supplied to a screw in-line type injection molding machine set to 240 to 280° C. and injection-molded under a mold temperature condition of 60° C. to obtain test pieces for Charpy impact strength measurement. The obtained test pieces were each left standing in an environment of 80° C. using a gear oven for 24 hours for heat history treatment. The Charpy impact strength of the test pieces thus receiving the heat history treatment was measured according to ISO179 in environments of 23° C. and −40° C.

<Measurement of Loss Tangent (Tan δ)>

The pellets of the resin compositions obtained in Examples and Comparative Examples were each supplied to a screw in-line type injection molding machine set to 240 to 280° C. and injection-molded under a mold temperature condition of 60° C. to prepare ISO test pieces. The test pieces were each installed in a viscoelasticity measuring machine "EPLEXOR 500N (manufactured by NETZSCH GABO Instruments GmbH)", and their loss tangents were measured at a tensile mode under temperature sweep conditions involving an oscillation frequency of 10 Hz, a strain of 0.2% under static stress, a strain of 0.1% under dynamic stress, a contact load of 0.5 N, a rate of temperature rise of 3° C./min, and a temperature range of −100° C. to 160° C. The tan δ ratio (−50° C. tan δ/0° C. tan δ) was calculated from the tan δ values read at −50° C. and 0° C. Similarly, the ratio between the tan δ values at −45° C. and 0° C. (−50° C. tan δ/0° C. tan δ) was calculated.

<Warpage of Molded Piece>

The pellets of the resin compositions obtained in Examples and Comparative Examples were each supplied to a screw in-line type injection molding machine set to 240 to 280° C. and injection-molded under a mold temperature condition of 60° C. to prepare 150×150×2 mm flat plates. For each of these flat plates, a hypothetical plane was established from 15 points described in FIG. 1 by the least square method using a 3-dimensional measuring system manufactured by Mitsutoyo Corp. The deviations of the positions of the 15 points from the plane were determined. The smallest value was subtracted from the largest value, and the resulting value was defined as the flatness of the flat plates. The smaller this value becomes, the less the warpage of a molded piece occurs.

TABLE 1

| | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| First raw material inlet | (a-1) Component | parts by mass | 10 | 10 | 10 | 10 | 10 | 10 | 10 | 10 | |
| | (a-2) Component | | | | | | | | | | 10 |
| | (b) Component | | 60 | 60 | 60 | 60 | 60 | 60 | 60 | 60 | 60 |
| | (c-1) Component | | 10 | 10 | 10 | 10 | 10 | 10 | 10 | 10 | 10 |
| | (c-2) Component | | | | | | | | | | |
| | (c-3) Component | | | | | | | | | | |
| | (d-1) Component | | 10 | | | | | | | | |
| Second raw material inlet | (a-1) Component | | 30 | 30 | 30 | 30 | 30 | 30 | 30 | 30 | |
| | (a-2) Component | | | | | | | | | | 30 |
| | (d-1) Component | | | | 10 | | | | | | |
| Third raw material inlet | (d-1) Component | | | | | 10 | 5 | 15 | | | 10 |
| | (d-2) Component | | | | | | | | 10 | | |
| | (d-3) Component | | | | | | | | 10 | | |
| | (d-4) Component | | | | | | | | | 10 | |
| | (f) Component | | | | | | | | | | |
| | (e-5) Component | | | | | | | | | | |
| | (h-1) Component | | | | | | | | | | |
| | (h-2) Component | | | | | | | | | | |
| Physical properties | Tensile elongation | % | 41 | 51 | 47 | 37 | 72 | 45 | 48 | 47 | 38 |
| | Standard deviation of tensile elongation (%) | | 0.9 | 3.3 | 2 | 0.9 | 3.6 | 3.1 | 5.2 | 7.2 | 3.1 |
| | Charpy (23° C.) | kJ/m² | 23 | 24 | 24 | 19 | 32 | 24 | 24 | 24 | 24 |
| | Charpy (−40° C.) | kJ/m² | 10 | 10 | 10 | 7 | 12 | 10 | 8 | 6 | 9.1 |
| | (−50° C. tanδ/0° C. tanδ) ratio | | 0.42 | 0.42 | 0.42 | 0.41 | 0.43 | 0.42 | 0.40 | 0.38 | 0.42 |
| | Warpage of molded piece | Flatness (mm) | 0.96 | 1.00 | 1.04 | 1.19 | 0.98 | 1.07 | 1.06 | 1.12 | 1.04 |

| | | | Ex. 10 | Ex. 11 | Ex. 12 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|
| First raw material inlet | (a-1) Component | parts by mass | 10 | 10 | 10 | 10 | 10 | 10 | 10 | 10 | 10 |
| | (a-2) Component | | | | | | | | | | |
| | (b) Component | | 40 | 40 | 40 | 60 | 60 | 60 | 60 | 60 | 60 |
| | (c-1) Component | | 10 | 10 | 10 | 20 | | | 10 | 10 | |
| | (c-2) Component | | | | | | 10 | | | | |
| | (c-3) Component | | | | | | | | | | 10 |
| | (d-1) Component | | | | | | | 10 | | | 10 |
| Second raw material inlet | (a-1) Component | | 50 | 50 | 50 | 30 | 30 | 30 | 30 | 30 | 30 |
| | (a-2) Component | | | | | | | | | | |
| | (d-1) Component | | | | | | | 10 | | | |
| Third raw material inlet | (d-1) Component | | 10 | 7 | 5 | | | | | | |
| | (d-2) Component | | | | | | | | | | |
| | (d-3) Component | | | | | | | | | | |
| | (d-4) Component | | | | | | | | | | |
| | (f) Component | | | | 3 | | | | | | |
| | (e-5) Component | | | | | | 5 | | | | |
| | (h-1) Component | | | | | | | | | 10 | |
| | (h-2) Component | | | | | | | | | | 10 |
| Physical properties | Tensile elongation | % | 222 | 208 | 58 | 37 | 13 | Immeasurable | 15 | 15 | 29 |
| | Standard deviation of tensile elongation (%) | | 2.9 | 5.1 | 2.5 | 14 | 3.1 | | 1.1 | 1.1 | 1.6 |
| | Charpy (23° C.) | kJ/m² | 25 | 24 | 27 | 26 | 17 | | 20 | 18 | 16 |
| | Charpy (−40° C.) | kJ/m² | 4 | 5 | 13 | 3 | 3 | | 7 | 6 | 6 |

TABLE 1-continued

|  |  |  |  |  |  |  |  |  |
|---|---|---|---|---|---|---|---|---|
| (−50° C. tanδ/0° C. tanδ) ratio |  | 0.42 | 0.47 | 0.47 | 0.36 | 0.37 | 0.28 | 0.29 | 0.41 |
| Warpage of molded piece | Flatness (mm) | 1.37 | 1.35 | 1.38 | 1.53 | 1.49 | 1.71 | 1.68 | 1.14 |

The test piece of Comparative Example 3 had peel-off and was thus immeasurable.

TABLE 2

| | | | Example 13 | Example 14 | Example 15 | Example 16 | Example 17 | Example 18 | Example 19 |
|---|---|---|---|---|---|---|---|---|---|
| First raw material inlet | (a-1) Component | parts by mass | 10 | 10 | 10 | 10 | 10 | 10 | 10 |
| | (a-2) Component | | | | | | | | |
| | (b) Component | | 60 | 60 | 60 | 60 | 60 | 60 | 40 |
| | (c-1) Component | | 10 | 10 | 10 | 10 | 10 | 10 | 10 |
| | (e-1) Component | | 10 | | | | | | |
| Second raw material inlet | (a-1) Component | | 30 | 30 | 30 | 30 | 30 | 30 | 50 |
| | (a-2) Component | | | | | | | | |
| | (c-1) Component | | | | | | | | |
| | (e-1) Component | | | 10 | | | | | |
| Third raw material inlet | (e-1) Component | | | | 10 | 5 | 15 | | 10 |
| | (e-2) Component | | | | | | | 10 | |
| | (e-3) Component | | | | | | | | |
| | (e-4) Component | | | | | | | | |
| Physical properties | Tensile elongation | % | 29 | 30 | 39 | 27 | 39 | 22 | 94 |
| | Standard deviation of tensile elonation (%) | | 1.3 | 1.3 | 1 | 1.4 | 0.5 | 1 | 7 |
| | Charpy (23° C.) | kJ/m$^2$ | 25 | 28 | 28 | 23 | 27 | 22 | 22 |
| | Charpy (−40° C.) | kJ/m$^2$ | 8 | 10 | 12 | 8 | 15 | 5 | 5 |
| | (−45° C. tanδ/0° C. tanδ) ratio | | 0.49 | 0.50 | 0.51 | 0.50 | 0.51 | 0.44 | 0.51 |
| | (−50° C. tanδ/0° C. tanδ) ratio | | 0.45 | 0.47 | 0.47 | 0.46 | 0.48 | 0.46 | 0.49 |
| | Warpage of molded piece | Flatness (mm) | 0.98 | 1.02 | 1.05 | 1.22 | 0.93 | 1.01 | 1.31 |

| | | | Example 20 | Comparative Example 7 | Comparative Example 8 | Comparative Example 9 | Comparative Example 10 | Comparative Example 11 |
|---|---|---|---|---|---|---|---|---|
| First raw material inlet | (a-1) Component | parts by mass | | 10 | 10 | 10 | 10 | 10 |
| | (a-2) Component | | 10 | | | | | |
| | (b) Component | | 60 | 60 | 60 | 60 | 60 | 60 |
| | (c-1) Component | | 10 | 20 | 10 | | 10 | 10 |
| | (e-1) Component | | | | | 10 | | |
| Second raw material inlet | (a-1) Component | | | 30 | 30 | 30 | 30 | 30 |
| | (a-2) Component | | 30 | | | | | |
| | (c-1) Component | | | | | | | |
| | (e-1) Component | | 10 | | | | | |
| Third raw material inlet | (e-1) Component | | | | | | | |
| | (e-2) Component | | | | | | | |
| | (e-3) Component | | | | | | 10 | |
| | (e-4) Component | | | | | | | 10 |
| Physical properties | Tensile elongation | % | 27 | 37 | 18 | 11 | 20 | 11 |
| | Standard deviation of tensile elonation (%) | | 1.5 | 14 | 5 | 8 | 2 | 1.2 |
| | Charpy (23° C.) | kJ/m$^2$ | 24 | 26 | 12 | 12 | 21 | 15 |
| | Charpy (−40° C.) | kJ/m$^2$ | 9.5 | 3 | 3 | 3 | 3 | 5 |
| | (−45° C. tanδ/0° C. tanδ) ratio | | 0.50 | 0.39 | 0.39 | 0.41 | 0.42 | 0.44 |
| | (−50° C. tanδ/0° C. tanδ) ratio | | 0.49 | 0.40 | 0.41 | 0.43 | 0.43 | 0.43 |
| | Warpage of molded piece | Flatness (mm) | 1.06 | 1.68 | 1.82 | 1.79 | 1.86 | 1.81 |

The present application is based on Japanese Patent Application No. 2013-206541 filed on Oct. 1, 2013 and Japanese Patent Application No. 2013-206526 filed on Oct. 1, 2013, the contents of which are incorporated herein by reference.

INDUSTRIAL APPLICABILITY

The resin composition and the molded article of the present invention have industrial applicability as parts for automobiles, heat-resistant parts, parts for electronics, industrial parts, and covering materials.

What is claimed is:

1. A resin composition comprising (a) a polypropylene-based resin, (b) a polyphenylene ether-based resin, and (c) a first hydrogenated block copolymer-based resin, and further comprising (d) an ethylene-1-octene copolymer rubber and/or (e) a second hydrogenated block copolymer-based resin, wherein
each of the components (c) and (e) is a hydrogenated block copolymer prepared by hydrogenating a block copolymer comprising at least one polymer block A composed mainly of a vinyl aromatic compound and at least one polymer block B composed mainly of a conjugated diene compound, and/or a modified product of the hydrogenated block copolymer,
a total ratio of a 1,2-vinyl bond and a 3,4-vinyl bond to all bonds in the conjugated diene compound units in the component (c) is 45 to 90%,
the component (c) comprises 30 to 50% by mass of the vinyl aromatic compound units,
a total ratio of a 1,2-vinyl bond and a 3,4-vinyl bond to all bonds in the conjugated diene compound units in the component (e) is 25% or more and less than 60%,
a rate of hydrogenation of ethylenic double bonds (double bonds in the conjugated diene compound units) in the block copolymer in the component (c) is 80 to 100%,
a rate of hydrogenation of ethylenic double bonds (double bonds in the conjugated diene compound units) in the block copolymer in the component (e) is 10% or higher and lower than 80%,
the component (d) has a shore A hardness (according to ASTM D-2240) of 75 or smaller, and
wherein in the resin composition, a ratio of a loss tangent at −50° C. (−50° C. tan δ) to a loss tangent at 0° C. (0° C. tan δ) (−50° C. tan δ/0° C. tan δ) obtained by the following measurement method is 0.39 or more;
<Measurement of loss tangent (tan δ)>
the loss tangent (tan δ) of an ISO test piece obtained from the resin composition is measured at −50° C. and 0° C. using a viscoelasticity measuring machine at a tensile mode under temperature sweep conditions involving an oscillation frequency of 10 Hz, a strain of 0.2% under static stress, a strain of 0.1% under dynamic stress, a contact load of 0.5 N, a rate of temperature rise of 3° C./min, and a temperature range of −100° C. to 160° C wherein when "d" is present the total content of the components (c) and (d) is 1 to 50 parts by mass with respect to the total content (100 parts by mass) of the components (a) and (b).

2. The resin composition according to claim 1, wherein the resin composition comprises at least the component (d).

3. The resin composition according to claim 1, wherein the component (d) has a melt flow rate (MFR; measured under a load of 2.16 kg at 190° C. according to ASTM D-1238) of 0.1 to 4.5 g/10 min.

4. The resin composition according to claim 2, wherein
a mass ratio between the components (a) and (b) ((a):(b)) is 25:75 to 99:1, and
a mass ratio between the components (c) and (d) ((c):(d)) is 1:99 to 99:1.

5. The resin composition according to claim 1, wherein the resin composition further comprises at least the component (e),
a total content of the components (c) and (e) is 1 to 50 parts by mass with respect to a total content (100 parts by mass) of the components (a) and (b),
a mass ratio between the components (a) and (b) ((a):(b)) is 25:75 to 99:1, and
a mass ratio between the components (c) and (e) ((c):(e)) is 1:99 to 99:1.

6. The resin composition according to claim 1, wherein the total ratio of a 1,2-vinyl bond and a 3,4-vinyl bond to all bonds in the conjugated diene compound units in the component (c) is 70 to 90%.

7. The resin composition according to claim 1, wherein the component (e) comprises 20 to 70% by mass of the vinyl aromatic compound units.

8. The resin composition according to claim 1, wherein the polymer block A constituting the component (e) has a number-average molecular weight (MneA) of 5,000 to 25,000.

9. The resin composition according to claim 1, further comprising (f) a third hydrogenated block copolymer-based resin, wherein
a content of the component (f) is 1 to 15 parts by mass with respect to a total content (100 parts by mass) of the components (a) and (b),
the component (f) is a hydrogenated block copolymer prepared by hydrogenating a block copolymer comprising at least one polymer block A composed mainly of a vinyl aromatic compound and at least one polymer block B composed mainly of a conjugated diene compound, and/or a modified product of the hydrogenated block copolymer,
the component (f) comprises 10% by mass or larger and smaller than 30% by mass of the vinyl aromatic compound units,
a total ratio of a 1,2-vinyl bond and a 3,4-vinyl bond to all bonds in the conjugated diene compound units in the component (f) is 25% or more and less than 70%,
a rate of hydrogenation of ethylenic double bonds (double bonds in the conjugated diene compound units) in the block copolymer in the component (f) is 80 to 100%, and
the polymer block A constituting the component (f) has a number-average molecular weight (MnfA) of 4,000 to 8,000.

10. The resin composition according to claim 1, wherein the resin composition comprises the component (d) and the component (e).

11. The resin composition according to claim 1, wherein the component (a) is homopolypropylene and/or block polypropylene, and
the component (a) has a melt flow rate (MFR; measured under a load of 2.16 kg at 230° C. according to JIS K7210) of 0.1 to 100 g/10 min.

12. The resin composition according to claim 1, wherein the resin composition has a matrix phase comprising the component (a) and a dispersed phase comprising the component (b).

13. A molded article comprising a resin composition according to any one of claims 1-3, 4-10, 11 or 12.

14. The resin composition according to claim 2, wherein the component (d) has a melt flow rate (MFR; measured under a load of 2.16 kg at 190° C. according to ASTM D-1238) of 0.1 to 4.5 g/10 min.

15. The resin composition according to claim 2, wherein the component (d) has a shore A hardness (according to ASTM D-2240) of 75 or smaller.

16. The resin composition according to claim 3, wherein the component (d) has a shore A hardness (according to ASTM D-2240) of 75 or smaller.

17. A resin composition comprising (a) a polypropylene-based resin, (b) a polyphenylene ether-based resin, and (c) a first hydrogenated block copolymer-based resin, and further comprising (d) an ethylene-1-octene copolymer rubber and/or (e) a second hydrogenated block copolymer-based resin, further comprising (f) a third hydrogenated block copolymer-based resin, wherein each of the components (c) and (e) is a hydrogenated block copolymer prepared by hydrogenating a block copolymer comprising at least one polymer block A composed mainly of a vinyl aromatic compound and at least one polymer block B composed mainly of a conjugated diene compound, and/or a modified product of the hydrogenated block copolymer, a total ratio of a 1,2-vinyl bond and a 3,4-vinyl bond to all bonds in the conjugated diene compound units in the component (c) is 45 to 90%, the component (c) comprises 30 to 50% by mass of the vinyl aromatic compound units, a total ratio of a 1,2-vinyl bond and a 3,4-vinyl bond to all bonds in the conjugated diene compound units in the component (e) is 25% or more and less than 60%, a rate of hydrogenation of ethylenic double bonds (double bonds in the conjugated diene compound units) in the block copolymer in the component (c) is 80 to 100%, a rate of hydrogenation of ethylenic double bonds (double bonds in the conjugated diene compound units) in the block copolymer in the component (e) is 10% or higher and lower than 80%, the component (d) has a shore A hardness (according to ASTM D-2240) of 75 or smaller, a content of the component (f) is 1 to 15 parts by mass with respect to a total content (100 parts by mass) of the components (a) and (b), the component (f) is a hydrogenated block copolymer prepared by hydrogenating a block copolymer comprising at least one polymer block A composed mainly of a vinyl aromatic compound and at least one polymer block B composed mainly of a conjugated diene compound, and/or a modified product of the hydrogenated block copolymer, the component (f) comprises 10% by mass or larger and smaller than 30% by mass of the vinyl aromatic compound units, a total ratio of a 1,2-vinyl bond and a 3,4-vinyl bond to all bonds in the conjugated diene compound units in the component (f) is 25% or more and less than 70%, a rate of hydrogenation of ethylenic double bonds (double bonds in the conjugated diene compound units) in the block copolymer in the component (f) is 80 to 100%, and the polymer block A constituting the component (f) has a number-average molecular weight (MnfA) of 4,000 to 8,000.

* * * * *